United States Patent
Gris et al.

(10) Patent No.: US 11,209,541 B1
(45) Date of Patent: Dec. 28, 2021

(54) ESTIMATING A LOCATION OF AN OBJECT IN CLOSE PROXIMITY TO AN ULTRASONIC TRANSDUCER

(71) Applicant: Chirp Microsystems, Inc., Berkeley, CA (US)

(72) Inventors: Florence Gris, Grenoble (FR); Agnes Duval, Grenoble (FR)

(73) Assignee: Chirp Microsystems, Inc., Berkeley, CA (US)

( * ) Notice: Subject to any disclaimer, the term of this patent is extended or adjusted under 35 U.S.C. 154(b) by 0 days.

(21) Appl. No.: 16/999,238

(22) Filed: Aug. 21, 2020

(51) Int. Cl.
*G01S 15/10* (2006.01)

(52) U.S. Cl.
CPC .................. *G01S 15/101* (2013.01)

(58) Field of Classification Search
CPC ..................................................... G01S 15/101
USPC ............................................................ 367/99
See application file for complete search history.

(56) References Cited

U.S. PATENT DOCUMENTS

2005/0066731 A1* 3/2005 Wall ...................... G01S 7/5273
73/597

* cited by examiner

*Primary Examiner* — Daniel L Murphy

(57) ABSTRACT

A device comprises a processor coupled with an ultrasonic transducer coupled which is configured to emit an ultrasonic pulse and receive returned signals received after a ringdown period of the transducer and corresponding to the emitted ultrasonic pulse. The processor is configured to evaluate the returned signals to find a candidate echo, from an object located in a ringdown blind spot area, in a time window between one and two times the ringdown period; locate multiple echoes from the object of higher order than the candidate echo; validate the candidate echo as at least a secondary echo associated of the object; and determine, based on analysis of the returned signals, an estimated distance from the transducer to the object in the ringdown blind spot area, wherein the ringdown blind spot area is located between the transducer and a closest distance at which objects can be sensed by the transducer.

22 Claims, 16 Drawing Sheets

900

---

EVALUATE, BY A PROCESSOR COUPLED WITH AN ULTRASONIC TRANSDUCER, RETURNED SIGNALS FROM A PULSE EMITTED BY THE ULTRASONIC TRANSDUCER, WHEREIN THE RETURNED SIGNALS ARE RECEIVED AFTER A RINGDOWN PERIOD OF THE ULTRASONIC TRANSDUCER TO FIND A CANDIDATE ECHO FROM AN OBJECT IN THE RETURNED SIGNALS, WHEREIN THE CANDIDATE ECHO OCCURS IN A TIME WINDOW BETWEEN ONE AND TWO TIMES THE RINGDOWN PERIOD OF THE ULTRASONIC TRANSDUCER
910

↓

LOCATE, BY THE PROCESSOR WITHIN THE RETURNED SIGNALS, MULTIPLE ECHOES FROM THE OBJECT WHICH ARE OF HIGHER ORDER THAN THE CANDIDATE ECHO
920

↓

VALIDATE, BY THE PROCESSOR BASED ON ANALYSIS OF AT LEAST TWO OF THE MULTIPLE ECHOES, THE CANDIDATE ECHO AS AT LEAST A SECONDARY ECHO ASSOCIATED WITH THE OBJECT LOCATED IN A RINGDOWN BLIND SPOT AREA OF THE ULTRASONIC TRANSDUCER, WHEREIN THE RINGDOWN BLIND SPOT AREA IS LOCATED BETWEEN THE ULTRASONIC TRANSDUCER AND A CLOSEST DISTANCE AT WHICH OBJECTS CAN BE SENSED BY THE ULTRASONIC TRANSDUCER
930

↓

ESTIMATE, BY THE PROCESSOR BASED ON ANALYSIS OF THE RETURNED SIGNALS, A DISTANCE FROM THE ULTRASONIC TRANSDUCER TO THE OBJECT IN THE RINGDOWN BLIND SPOT AREA
940

↓

PROVIDE, BY THE PROCESSOR, A SIGNAL INDICTING THE ESTIMATED DISTANCE FROM THE ULTRASONIC TRANSDUCER TO THE OBJECT
950

EVALUATE, BY A PROCESSOR COUPLED WITH AN ULTRASONIC TRANSDUCER, RETURNED SIGNALS FROM A PULSE EMITTED BY THE ULTRASONIC TRANSDUCER, WHEREIN THE RETURNED SIGNALS ARE RECEIVED AFTER A RINGDOWN PERIOD OF THE ULTRASONIC TRANSDUCER, TO FIND A CANDIDATE ECHO IN THE RETURNED SIGNALS WHICH OCCURS IN A TIME WINDOW BETWEEN ONE AND TWO TIMES THE RINGDOWN PERIOD OF THE ULTRASONIC TRANSDUCER AND WHICH EXCEEDS A PREESTABLISHED THRESHOLD OF MAGNITUDE
1010

↓

LOCATE, BY THE PROCESSOR WITHIN THE RETURNED SIGNALS, MULTIPLE ECHOES OF SEQUENTIALLY DIMINISHING MAGNITUDE AT SUBSTANTIALLY REGULARLY SPACED OFFSETS FROM THE CANDIDATE ECHO
1020

↓

VALIDATE, BY THE PROCESSOR BASED ON ANALYSIS OF AT LEAST TWO OF THE MULTIPLE ECHOES, THAT THE CANDIDATE ECHO IS AT LEAST A SECONDARY ECHO ASSOCIATED WITH AN OBJECT LOCATED IN THE RINGDOWN BLIND SPOT AREA OF THE ULTRASONIC TRANSDUCER WHEREIN THE RINGDOWN BLIND SPOT AREA IS LOCATED BETWEEN THE ULTRASONIC TRANSDUCER AND A CLOSEST DISTANCE AT WHICH OBJECTS CAN BE SENSED BY THE ULTRASONIC TRANSDUCER
1030

↓

PROVIDE, BY THE PROCESSOR, A SIGNAL INDICTING PRESENCE OF THE OBJECT BEING DETECTED WITHIN THE RINGDOWN BLIND SPOT AREA ASSOCIATED WITH THE ULTRASONIC TRANSDUCER
1040

DETERMINE, BY THE PROCESSOR BASED ON ANALYSIS OF THE CANDIDATE ECHO AND THE MULTIPLE ECHOES, AN ESTIMATED DISTANCE FROM THE ULTRASONIC TRANSDUCER TO THE OBJECT IN THE RINGDOWN BLIND SPOT AREA
1050

PROVIDE, BY THE PROCESSOR, A SIGNAL INDICTING THE ESTIMATED DISTANCE FROM THE ULTRASONIC TRANSDUCER TO THE OBJECT
1060

1100

EVALUATE, BY A PROCESSOR COUPLED WITH AN ULTRASONIC TRANSDUCER, RETURNED SIGNALS FROM A PULSE EMITTED BY THE ULTRASONIC TRANSDUCER, WHEREIN THE RETURNED SIGNALS ARE RECEIVED AFTER A RINGDOWN PERIOD OF THE ULTRASONIC TRANSDUCER, TO FIND A CANDIDATE ECHO IN THE RETURNED SIGNALS WHICH OCCURS IN A TIME WINDOW BETWEEN ONE AND TWO TIMES THE RINGDOWN PERIOD OF THE ULTRASONIC TRANSDUCER AND WHICH EXCEEDS A PREESTABLISHED THRESHOLD OF MAGNITUDE
1110

LOCATE, BY THE PROCESSOR WITHIN THE RETURNED SIGNALS, AN ADDITIONAL ECHO HAVING A SIMILAR SHAPE TO THE CANDIDATE ECHO, WHEREIN THE ADDITIONAL ECHO OCCURS LATER IN THE TIME WINDOW THAN THE CANDIDATE ECHO
1120

VALIDATE, BY THE PROCESSOR BASED ON ANALYSIS OF THE CANDIDATE ECHO AND THE ADDITIONAL ECHO, THAT THE CANDIDATE ECHO IS LIKELY AT LEAST A SECONDARY ECHO ASSOCIATED WITH AN OBJECT LOCATED IN THE RINGDOWN BLIND SPOT AREA OF THE ULTRASONIC TRANSDUCER WHEREIN THE RINGDOWN BLIND SPOT AREA IS LOCATED BETWEEN THE ULTRASONIC TRANSDUCER AND A CLOSEST DISTANCE AT WHICH OBJECTS CAN BE SENSED BY THE ULTRASONIC TRANSDUCER
1130

PROVIDE, BY THE PROCESSOR, A SIGNAL INDICTING PRESENCE OF THE OBJECT BEING DETECTED WITHIN THE RINGDOWN BLIND SPOT AREA ASSOCIATED WITH THE ULTRASONIC TRANSDUCER
1140

DETERMINE, BY THE PROCESSOR BASED ON ANALYSIS OF THE CANDIDATE ECHO AND THE ADDITIONAL ECHO, AN ESTIMATED DISTANCE FROM THE ULTRASONIC TRANSDUCER TO THE OBJECT IN THE RINGDOWN BLIND SPOT AREA
1150

PROVIDE, BY THE PROCESSOR, A SIGNAL INDICTING THE ESTIMATED DISTANCE FROM THE ULTRASONIC TRANSDUCER TO THE OBJECT
1160

ESTIMATING A LOCATION OF AN OBJECT IN CLOSE PROXIMITY TO AN ULTRASONIC TRANSDUCER

BACKGROUND

A variety of devices exist which utilize sonic sensors (e.g., sonic emitters and receivers, or sonic transducers). By way of example, and not of limitation, a device may utilize one or more sonic sensors to track the location of the device in space, to detect the presence of objects in the environment of the device, and/or to avoid objects in the environment of the device. Such sonic sensors include transmitters which transmit sonic signals, receivers which receive sonic signals, and transducers which both transmit sonic signals and receive sonic signals. Many of these sonic transducers emit signals in the ultrasonic range, and thus may be referred to as ultrasonic transducers. Piezoelectric Micromachined Ultrasonic Transducers (PMUTs), which may be air-coupled, are one type of sonic transducer which operates in the ultrasonic range. Sonic transducers, including ultrasonic transducers, can be used for a large variety of sensing applications such as, but not limited to: virtual reality controller tracking, presence detection, object detection/location, and object avoidance. For example, drones, robots, security systems or other devices may use ultrasonic transducers and/or other sonic transducers in any of these or numerous other applications.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 9 illustrates a flow diagram of a method of estimating a location of an object in close proximity to an ultrasonic transducer, in accordance with various embodiments.

FIGS. 10A and 10B illustrate a flow diagram of a method of determining presence of an object in a ringdown blind spot area of an ultrasonic transducer, in accordance with various embodiments.

FIGS. 11A and 11B illustrate a flow diagram of a method of determining presence of an object in a ringdown blind spot area of an ultrasonic transducer, in accordance with various embodiments.

DESCRIPTION OF EMBODIMENTS

Figure 1A:
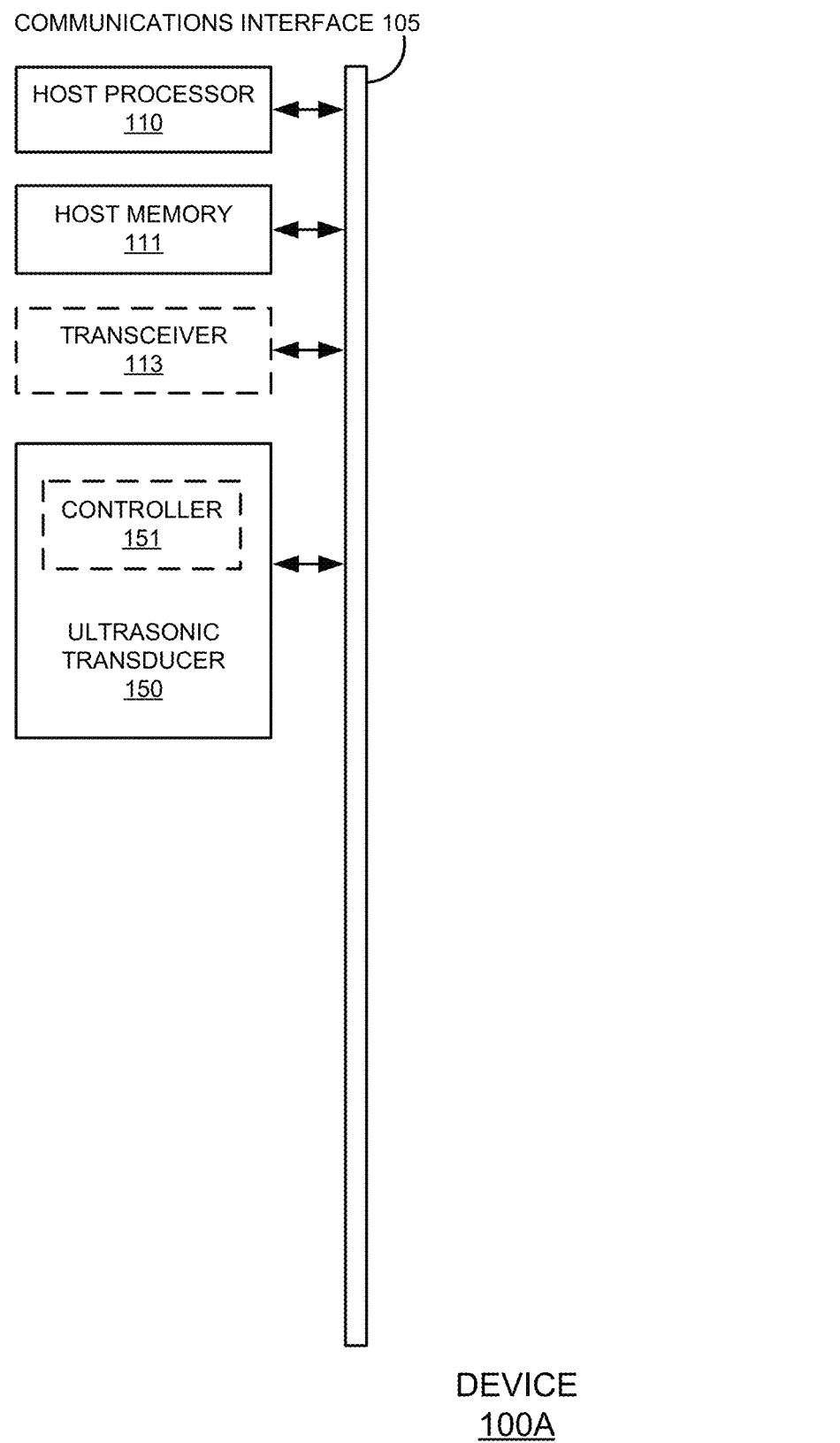
FIGS. 1A and 1B show example block diagrams of some aspects of a device which includes a sonic transducer, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope of the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

Sonic transducers, which include ultrasonic transducers, emit a pulse (e.g., an ultrasonic sound) and then receive returned signals (i.e., echoes) which correspond to the emitted pulse. Consider a transducer which has part of its duty cycle devoted to emitting a pulse or other signals and another part of its duty cycle devoted to receiving returned signals which are echoes of the emitted pulse/signals. In such a transducer, the returned signals can be used to detect the presence and/or location of objects from which the emitted pulse reflects and then returns to the transducer as a returned signal. The physics of the operation of a transducer mean that it is vibrating while emitting a pulse (in the emitting portion of its duty cycle) and perhaps shortly afterward due to the emission of the pulse. This vibration due to the emission of a pulse from a transducer has a very high amplitude and is referred to as "ringdown." While ringdown is present, detection of returned signals (in the receiving portion of its duty cycle) is difficult or, more likely, impossible due to the amplitude of the emitted pulse and its associated vibrations of a membrane of the transducer drowning out the weaker amplitude of returned signals. The time period associated with ringdown for a sonic transducer is assimilated to and corresponds to a blind spot, which is referred to herein as a "ringdown blind spot area." The ringdown blind spot area is an area between the sonic transducer and the closest distance at which an object can be sensed by the sonic transducer using returned signals that correspond to signals emitted by the transducer. Put differently, the ringdown blind spot area is defined by a round trip time-of-flight of a sonic signal and corresponding returned signal which is equal to the length of the ringdown time period of the transducer. A round trip time-of-flight longer than the ringdown time period of the sonic transducer will result in a returned signal which can be received and discriminated (i.e., not overcome by the amplitude of ringdown vibration) by the sonic transducer. A round trip time-of-flight equal to or shorter than the ringdown time period of the sonic transducer will result in a returned signal which cannot be received and discriminated (i.e., it will be overcome by the amplitude of ringdown vibration) by the sonic transducer. Ringdown blind spot areas vary between different types of transducers, but ringdown blind spot areas of between 15 and 25 centimeters in range from a transducer are fairly common in conventional MEMS (Micro-Electro-Mechanical Systems) ultrasonic transducers. Thus, objects which are very close to a sonic transducer and in the ringdown blind spot area may not be detected or located by the sonic transducer due to their first order returned signals being indistinguishable due to the amplitude of ringdown vibration.

Herein, a variety of methods, sonic transducers, devices, and techniques are described for facilitating detection and/or location (i.e., estimating distance from the sonic transducer) of an object located in a ringdown blind spot area of a sonic transducer. Although this technology is described herein with reference to ultrasonic transducers, it is broadly applicable to any sonic transducer which has ringdown and an associated ringdown blind spot area. Detecting that an object is in a ringdown blind spot area of a transducer, in accordance with the techniques described herein, permits a device to take a responsive action based on the detection. Estimating the location of the detected object in the ringdown blind spot area, in accordance with the techniques described herein, permits a device to alter and/or carryout operation of the device based on knowledge of the location of the object (such as safely navigating nearer to an object, such as a wall, than would otherwise be possible).

Discussion begins with a description of notation and nomenclature. Discussion then shifts to description of some block diagrams of example components of an example device and a sensor processing unit which may utilize an ultrasonic transducer (or other sonic transducer). The device may be any type of device which utilizes sonic sensing, for example any device which uses conventional ultrasonic transducers may employ the techniques and methods described herein. Discussion then moves to description of a device using a sonic transducer to detect an object, and includes a depiction and discussion of returned signals from an object outside of a ringdown blind spot area and from an object inside of a ringdown blind spot area. Returned signals from an emitted pulse are discussed along with methods for utilizing the returned signals to detect and/or locate an object in close proximity (e.g., inside of a ringdown blind spot area) to a sonic transducer. Operation of a device and/or components thereof are described in conjunction with a method of estimating a location of an object in close proximity (e.g., inside of a ringdown blind spot area) to an ultrasonic transducer. Discussion concludes with description of some methods of using ultrasonic transducers (and devices which include them) to determine the presence of and/or locate an object in close proximity (e.g., inside of a ringdown blind spot area) to the ultrasonic transducer.

Notation and Nomenclature

Some portions of the detailed descriptions which follow are presented in terms of procedures, logic blocks, processes, modules and other symbolic representations of operations on data bits within a computer memory. These descriptions and representations are the means used by those skilled in the data processing arts to most effectively convey the substance of their work to others skilled in the art. In the present application, a procedure, logic block, process, module, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device/component.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "adjusting," "autocorrelating," "comparing," "determining," "emitting," "estimating," "evaluating," "finding," "indicating," "locating," "measuring," "performing," "providing," "selecting," "signaling," "validating," or the like, may refer to the actions and processes of an electronic device or component such as: a host processor, a sensor processing unit, a sensor processor, a digital signal processor (DSP), an application specific integrated circuit (ASIC), an application specific instruction set processors (ASIP), a field programmable gate arrays (FPGA), a controller or other processor, a memory, some combination thereof, or the like. The electronic device/component manipulates and transforms data represented as physical (electronic and/or magnetic) quantities within the registers and memories into other data similarly represented as physical quantities within memories or registers or other such information storage, transmission, processing, or display components.

Embodiments described herein may be discussed in the general context of processor-executable instructions residing on some form of non-transitory processor-readable medium, such as program modules or logic, executed by one or more computers, processors, or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example electronic device(s) described herein may include components other than those shown, including well-known components.

The techniques described herein may be implemented in hardware, or a combination of hardware with firmware and/or software, unless specifically described as being implemented in a specific manner. Any features described as modules or components may also be implemented together in an integrated logic device or separately as discrete but interoperable logic devices. If implemented in software, the techniques may be realized at least in part by a non-transitory computer/processor-readable storage medium comprising computer/processor-readable instructions that, when executed, cause a processor and/or other components of a computer or electronic device to perform one or more of the methods described herein. The non-transitory processor-readable data storage medium may form part of a computer program product, which may include packaging materials.

The non-transitory processor-readable storage medium (also referred to as a non-transitory computer-readable storage medium) may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as host processor(s) or core(s) thereof, DSPs, general purpose microprocessors, ASICs, ASIPs, FPGAs, sensor processors, microcontrollers, or other equivalent integrated or discrete logic circuitry. The term "processor" or the term "controller" as used herein may refer to any of the foregoing structures, any other structure suitable for implementation of the techniques described herein, or a combination of such structures. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a plurality of microprocessors, one or more microprocessors in conjunction with an ASIC or DSP, or any other such configuration or suitable combination of processors.

In various example embodiments discussed herein, a chip is defined to include at least one substrate typically formed from a semiconductor material. A single chip may for example be formed from multiple substrates, where the substrates are mechanically bonded to preserve the functionality. Multiple chip (or multi-chip) includes at least two substrates, wherein the two substrates are electrically connected, but do not require mechanical bonding.

A package provides electrical connection between the bond pads on the chip (or for example a multi-chip module) to a metal lead that can be soldered to a printed circuit board (or PCB). A package typically comprises a substrate and a cover. An Integrated Circuit (IC) substrate may refer to a silicon substrate with electrical circuits, typically CMOS circuits but others are possible and anticipated. A MEMS substrate provides mechanical support for the MEMS structure(s). The MEMS structural layer is attached to the MEMS substrate. The MEMS substrate is also referred to as handle substrate or handle wafer. In some embodiments, the handle substrate serves as a cap to the MEMS structure.

Some embodiments may, for example, comprise a sonic transducer. The sonic transducer may be an ultrasonic transducer. This ultrasonic transducer may operate in any suitable ultrasonic range. In some embodiments, the ultrasonic transducer may be or include a Piezoelectric Micromachined Ultrasonic Transducer (PMUT) which may be an air coupled PMUT. In some embodiments, the ultrasonic transducer may include a DSP or other controller or processor which may be disposed as a part of an ASIC which may be integrated into the same package as the ultrasonic transducer. Such packaged embodiments may be referred to as either an "ultrasonic transducer" or an "ultrasonic transducer device." In some embodiments, the ultrasonic transducer (and any package of which it is a part) may be included in one or more of a sensor processing unit and/or a device which includes a host processor or other controller or control electronics.

Example Device

Figure 1B:
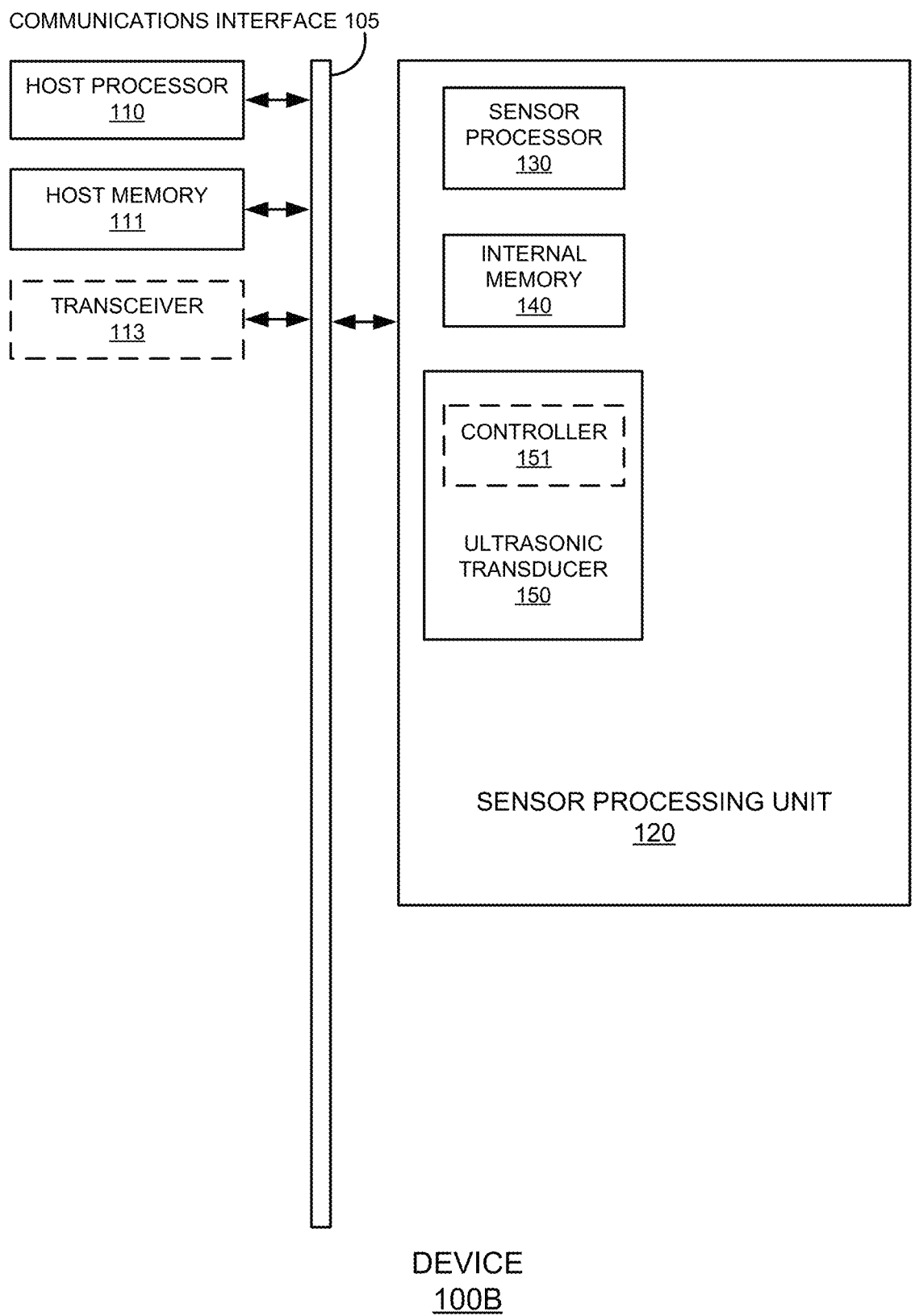

FIGS. 1A and 1B show example block diagrams of some aspects of a device 100 (see FIG. 2) which includes a sonic transducer such as ultrasonic transducer 150, in accordance with various embodiments. Some examples of a device 100 may include, but are not limited to: remote controlled vehicles, virtual reality remotes, a telepresence robot, an electric scooter, an electric wheelchair, a wheeled delivery robot, a flyable drone, a mobile surface vehicle, an automobile, an autonomous mobile device, a floor vacuum, a smart phone, a tablet computer, a security system, and a robotic cleaning appliance. By way of example, and not of limitation, the device 100 may utilize one or more ultrasonic transducers 150 to track the location of the device 100 in space, to detect the presence of objects in the environment of the device 100, to sense the absence of objects in the environment of device 100, to characterize objects sensed in the environment of device 100, to locate a detected object in two or three dimensional space with respect to the device 100, and/or to avoid objects in the environment of the device 100.

FIG. 1A shows a block diagram of components of an example device 100A, in accordance with various aspects of the present disclosure. As shown, example device 100A comprises a communications interface 105, a host processor 110, host memory 111, and at least one ultrasonic transducer 150. In some embodiments, device 100 may additionally include one or more of a transceiver 113, and one or more motion sensors or other types of sensors. Some embodiments of device 100A may include sensors used to detect motion, position, or environmental context; some examples of these sensors may include, but are not limited to, infrared sensors, cameras, microphones, atmospheric pressure sensors, temperature sensors, and global navigation satellite system sensors (i.e., a global positioning system receiver).

As depicted in FIG. 1A, included components are communicatively coupled with one another, such as, via communications interface 105.

The host processor 110 may, for example, be configured to perform the various computations and operations involved with the general function of a device 100. Host processor 110 can be one or more microprocessors, central processing units (CPUs), DSPs, general purpose microprocessors, ASICs, ASIPs, FPGAs or other processors which run software programs or applications, which may be stored in host memory 111, associated with the general and conventional functions and capabilities of device 100.

Communications interface 105 may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent and may include a plurality of communications interfaces. Communications interface 105 may facilitate communication between sensor processing unit (SPU) 120 (see e.g., FIG. 1B) and one or more of host processor 110, host memory 111, transceiver 113, ultrasonic transducer 150, and/or other included components.

Host memory 111 may comprise programs, modules, applications, or other data for use by host processor 110. In some embodiments, host memory 111 may also hold information that that is received from or provided to SPU 120 (see e.g., FIG. 1B). Host memory 111 can be any suitable type of memory, including but not limited to electronic memory (e.g., read only memory (ROM), random access memory (RAM), or other electronic memory). Host memory 111 may include instructions to implement one or more of the methods described herein (such as in FIGS. 7-11B) using host processor 110 and ultrasonic transducer 150.

Transceiver 113, when included, may be one or more of a wired or wireless transceiver which facilitates receipt of data at device 100 from an external transmission source and transmission of data from device 100 to an external recipient. By way of example, and not of limitation, in various embodiments, transceiver 113 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications (or the like) for wireless personal area network communication), and a wired a serial transceiver (e.g., a universal serial bus for wired communication).

Ultrasonic transducer 150 is configured to emit and receive ultrasonic signals which are in the ultrasonic range. In some embodiments, ultrasonic transducer 150 may include a controller 151 for locally controlling the operation of the ultrasonic transducer 150. Additionally, or alternatively, in some embodiments, one or more aspects of the operation of ultrasonic transducer 150 or components thereof may be controlled by an external component such as host processor 110. Device 100A may contain a single ultrasonic transducer 150, or may contain a plurality of ultrasonic transducers, for example in the form of an array of ultrasonic transducers. For example, in an embodiment with a single ultrasonic transducer that is used for transmitting (e.g., emitting) and receiving, the ultrasonic transducer may be in an emitting phase for a portion of its duty cycle and in a receiving phase during another portion of its duty cycle.

Controller 151, when included, may be any suitable controller, many types of which have been described herein. In some embodiments, a controller 151 control the duty cycle (emit or receive) of the ultrasonic transducer 150 and the timing of switching between emitting and receiving. In some embodiments, a controller 151 may perform some amount of the processing of received returned signals.

FIG. 1B shows a block diagram of components of an example device 100B, in accordance with various aspects of the present disclosure. Device 100B is similar to device 100A except that it includes a sensor processing unit (SPU) 120 in which ultrasonic transducer 150 is disposed. SPU 120, when included, comprises: a sensor processor 130; an internal memory 140; and at least one ultrasonic transducer 150. Though not depicted, in some embodiments, SPU 120 may additionally include one or more motion sensors and/or one or more other sensors such as a light sensor, infrared sensor, GNSS sensor, temperature sensor, barometric pressure sensor, microphone, etc. In various embodiments, SPU 120 or a portion thereof, such as sensor processor 130, is communicatively coupled with host processor 110, host memory 111, and other components of device 100 through communications interface 105 or other well-known means. SPU 120 may also comprise one or more communications interfaces (not shown) similar to communications interface 105 and used for communications among one or more components within SPU 120.

Sensor processor 130 can be one or more microprocessors, CPUs, DSPs, general purpose microprocessors, ASICs, ASIPs, FPGAs or other processors that run software programs, which may be stored in memory such as internal memory 140 (or elsewhere), associated with the functions of SPU 120. In some embodiments, one or more of the functions described as being performed by sensor processor 130 may be shared with or performed in whole or in part by another processor of a device 100, such as host processor 110.

Internal memory 140 can be any suitable type of memory, including but not limited to electronic memory (e.g., read only memory (ROM), random access memory (RAM), or other electronic memory). Internal memory 140 may store algorithms, routines, or other instructions for instructing sensor processor 130 on the processing of data output by one or more of ultrasonic transducer 150 and/or other sensors. In some embodiments, internal memory 140 may store one or more modules which may be algorithms that execute on sensor processor 130 to perform a specific function. Some examples of modules may include, but are not limited to: statistical processing modules, motion processing modules, object detection modules, object location modules, and/or decision-making modules. Modules may include instructions to implement one or more of the methods described herein, such as in FIGS. 7-11B.

Ultrasonic transducer 150, as previously described, is configured to emit and receive ultrasonic signals which are in the ultrasonic range. In some embodiments, ultrasonic transducer 150 may include a controller 151 for locally controlling the operation of the ultrasonic transducer 150. Additionally, or alternatively, in some embodiments, one or more aspects of the operation of ultrasonic transducer 150 or components thereof may be controlled by an external component such as sensor processor 130 and/or host processor 110. Ultrasonic transducer 150 is communicatively coupled with sensor processor 130 by a communications interface (such as communications interface 105), bus, or other well-known communication means.

Controller 151, when included, may be any suitable controller, many types of which have been described herein. For example, controller 151 may turn amplifiers of ultrasonic transducer 150 on or off, turn transmitters on or off, and/or interpret and carryout instructions received from external to ultrasonic transducer 150.

Figure 2:
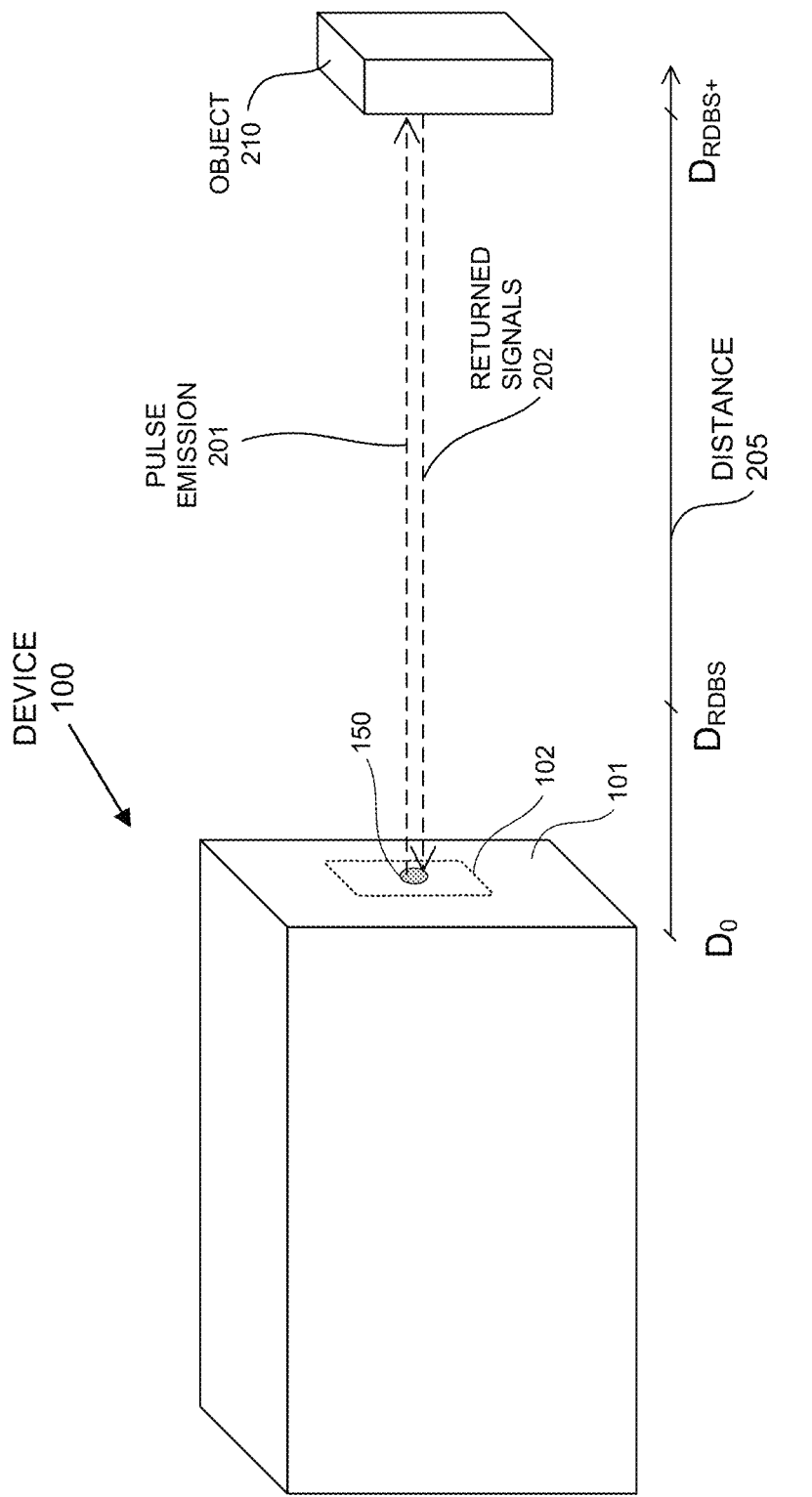
FIG. 2 shows an example external depiction of a device using a sonic transducer to detect an object, in accordance with various embodiments.

FIG. 2 shows an example external depiction of a device 100 using a sonic transducer such as ultrasonic transducer 150 to detect an object 210, in accordance with various embodiments. Device 100 includes an external housing 101 which, in some embodiments, reflects some returned signals that have echoed back to device 100 after reflecting off an object. Ultrasonic transducer 150 may be recessed below, be even with, or protrude from the external housing 101 of device 100. In some embodiments, a reflective surface 102 may be included which surrounds all or a part of the portion of ultrasonic transducer 150.

When included, reflective surface 102 may comprise a holder for ultrasonic transducer 150. In some embodiments, reflective surface 102 may comprise the same material as housing 101 if the reflectivity of external housing 101 is sufficient. In some embodiments, reflective surface 102 may be shaped (e.g., in a parabolic shape) to improve reflectivity of a returned signal back toward an object from which it was returned, may be comprised of a material which has a specified reflectivity, and/or may include a surface treatment (such as polishing, painting, or coating) which facilitates reflecting of returned signals and/or improves reflectivity of returned signals over that of the surface of housing 101. In some embodiments, the reflective surface is configured to facilitate generation of higher order echoes from an object in the ringdown blind spot area or to be more reflective (than other materials of the external housing 101) so as to increase the amplitude of higher order echoes from an object.

An arrow 205 below device 100 and object 210 illustrates the distance between device 100 and object 210. It should be appreciated that any distances may be equated to a time for a roundtrip time-of-flight of an emitted pulse and a corresponding returned signal. Distance D0 is located at a position that begins even with ultrasonic transducer 150. Other distances are measured outward from this position/distance. For example, as described previously a blind spot is associated with the round-trip time of flight of returned signals which return during the ringdown period of transducer 150. The ringdown blind spot occupies a distance starting at and extending outward from the ultrasonic transducer 150 to the point at which a primary signal reflected back from an object can be both received and distinguished by transducer 150. The ringdown blind spot area is specific to transducers that both emit a signal and then receive returned signals that correspond to the emitted signal. The outermost portion of this distance is referred to in FIG. 2 as the Ringdown Blind Spot Distance, DRDBS, and indicates the end of the ringdown blind spot area associated with ultrasonic transducer 150. Objects outside of DRDBS can be sensed and located by their primary returned signals which are received by transducer 150 after the ringdown period has finished. Objects between D0 and DRDBS will still reflect primary returned signals back to transducer 150, but the transducer 150 may not or will not be capable of distinguishing them from ringdown vibrations of transducer 150. Distance DRDBS+ represents the location of object 210 outside (i.e., at a greater distance) than the end of the ringdown blind spot at DRDBS. The distance between D0 and DRDBS is thus a ringdown blind spot area 275 where objects may be harder or impossible to detect because of ringdown vibrations in transducer 150.

The ringdown blind spot area varies depending on the transducer but may be in the range of 10 cm-25 cm in some embodiments. In other embodiments, a transducer may have a much smaller blind spot in the range of a few centimeters or may have a larger blind spot such as 40 centimeters. Because object 210 is outside of the ringdown blind spot area 275, it is thus detected and/or located, without any issue from ringdown, by pulse emission 201 and the returned signals 202 that correspond to pulse emission 201, reflect from object 210 as primary reflections/returned signals, and are received by ultrasonic transducer 150. However, should object 210 be between distance D0 and distance DRDBS (e.g., due to movement of object 210 or device 100) techniques for detecting and locating object 210 using primary returned signals will be inadequate as such primary returned signals will be difficult or impossible to distinguish over the ringdown vibrations of transducer 150. An example of this situation, where object 210 is in the ringdown blind spot area 275 located between D0 and DRDBS, is depicted in FIG. 4A and by the graphed returned signals 330 of FIG. 3 (which show that returned signals from object 210 are not discernable when the object is in the ringdown blind spot area).

Figure 3:
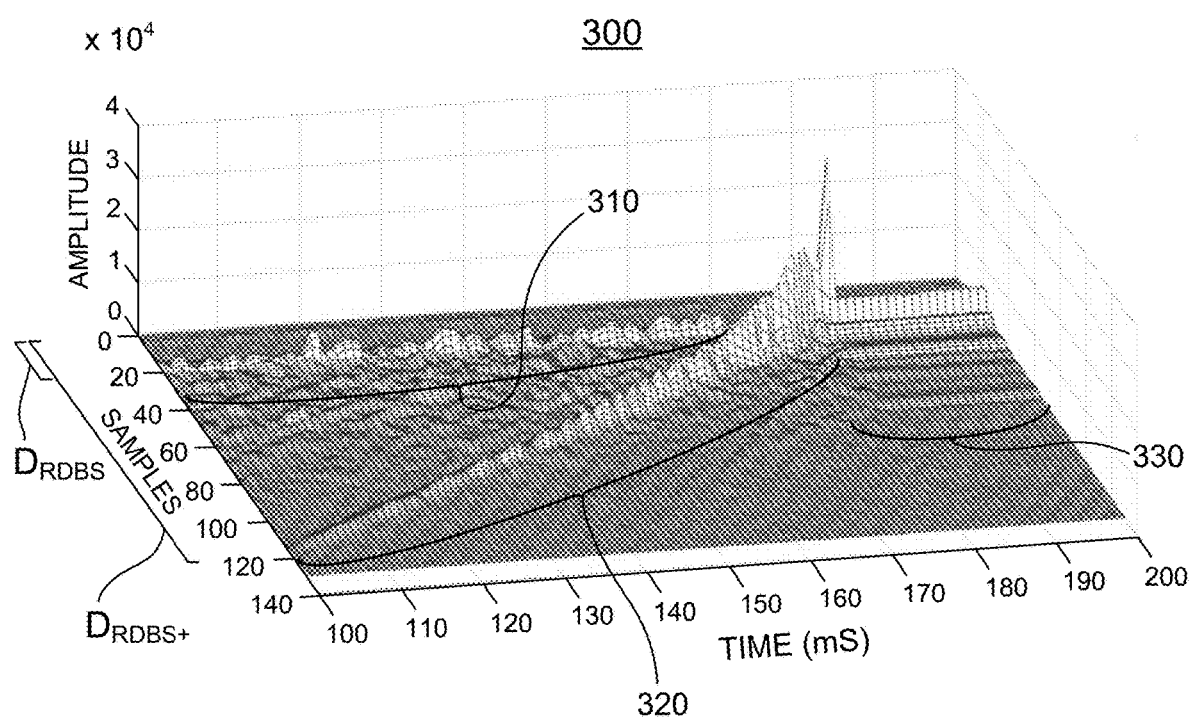
FIG. 3 illustrates a graph of returned signals received by a sonic transducer and a ringdown blind spot area of the sonic transducer, in accordance with various embodiments.

FIG. 3 illustrates a graph 300 of returned signals received by a sonic transducer and a ringdown blind spot area of the sonic transducer, in accordance with various embodiments. Signals 310 represent the environmental noise floor. In FIG. 3, the X-axis is in time (e.g., milliseconds), the Y-axis represents samples taken over a distance (e.g., about 130 samples over about 100 centimeters); and the Z-axis corresponds to amplitude of the received returned signals. Signals 320, from left to right, represent an object such as object 210 approaching transducer 150 (located at 0 cm) from a distance such as $D_{RDBS+}$ (e.g., starting at approximately 120 cm) and ending at $D_{RDBS}$ (which is located at approximately 20 cm), where the returned signals cease to be received due to ringdown vibrations rendering them indistinguishable. The returned signals 320 in FIG. 3 represent returned signals received over time from multiple emitted ultrasonic pulses as an object, such as object 210, moves closer to the transducer 150 which is emitting the ultrasonic pulses. The amplitude of returned signals 320 increases as the object gets closer to the transducer, until disappearing when the object enters the ringdown blind spot area of the transducer. Signals 330 which occur from approximately in a range of approximately 0 cm to 20 cm from ultrasonic transducer 150 represents the ringdown signals (noise and vibrations) in the ringdown blind spot area of this particular ultrasonic transducer 150, which tend to make received returned signals difficult or impossible to distinguish. In the ringdown blind spot area, object 210 is not detected by receipt of a primary reflection of an emitted ultrasonic pulse. Indeed, in many ultrasonic transducer implementations, data from the ringdown signals 330 is considered to contain no valuable information and is either not analyzed, discarded, filtered out, or cancelled via cancellation logic.

Figure 4A:
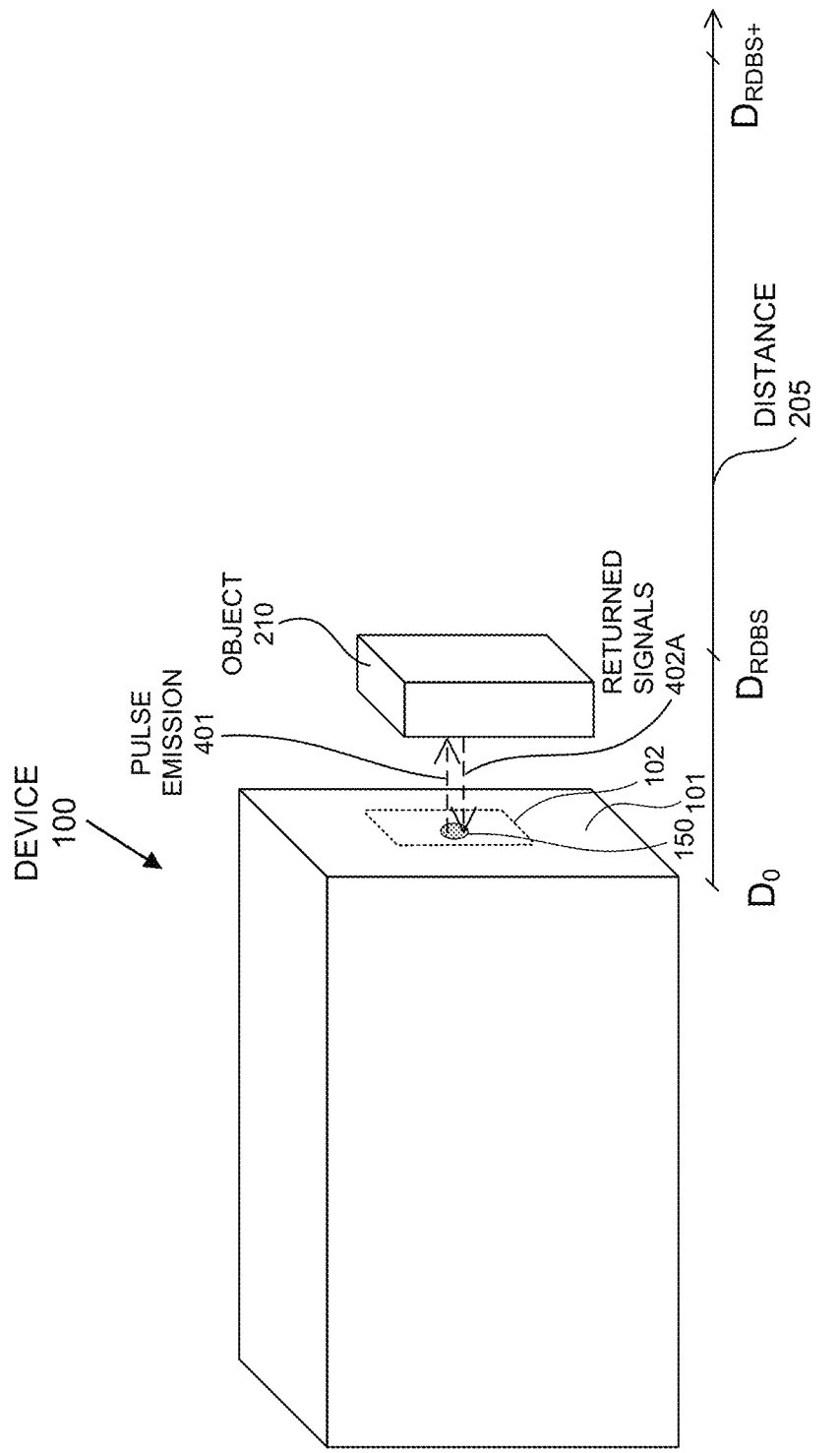
FIG. 4A shows an example external depiction of a device using a sonic transducer, such as an ultrasonic transducer, to emit sonic signals and receive reflected returned signals from an object, in accordance with various embodiments.

FIG. 4A shows an example external depiction of a device 100 using a sonic transducer such as ultrasonic transducer 150 to emit sonic signals and receive reflected returned signals from an object 210, in accordance with various embodiments. FIG. 4A is similar to FIG. 2 except that object 210 is now located in the ringdown blind spot area between Do and $D_{RDBS}$. In FIG. 4A emitted ultrasonic pulse 401 is reflected from object 210 and received as corresponding returned signals 402A. However, because of the ringdown vibrations this primary reflection of returned signals 402A back to transducer 150 is not distinguishable, and thus object 210 is not sonically detected and/or located by receipt of returned signals 402A.

Figure 4B:
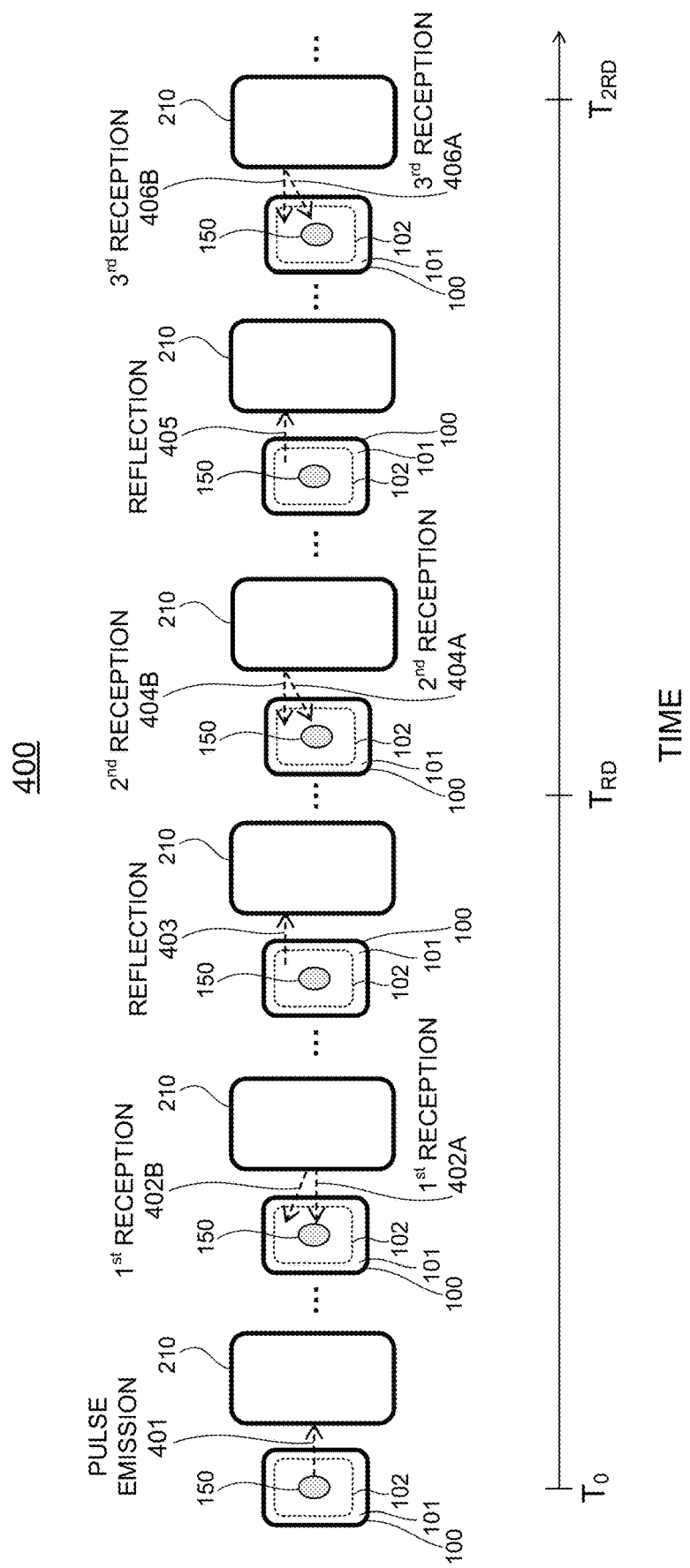
FIG. 4B illustrates a time-lapse of receipt of returned signals, in the form of multiple higher order echoes, by a sonic transducer from an object that is in the ringdown blind spot area of the sonic transducer, in accordance with various embodiments.

FIG. 4B illustrates a time-lapse 400 of the receipt of returned signals, in the form of multiple higher order echoes, by a sonic transducer from an object that is in the ringdown blind spot area of the sonic transducer, in accordance with various embodiments. A timeline at the bottom of FIG. 4B illustrates timing of the occurrence of various emissions, reflections, and receptions of signals. It should be appreciated that the angles illustrated by the various arrows representing emitted signals, returned signals, and reflections are exaggerated for purposes of illustration. It should also be appreciated that round-trip times of flight represented by the timeline could also be expressed as distances from ultrasonic transducer 150. The timeline begins at time zero (T0), is demarcated at a point/time where ringdown from emitting an ultrasonic pulse ends (TRD), and is additionally demarcated at a time which is equivalent to twice the ringdown period (T2RD). With reference to FIG. 4A, object 210 is in the ringdown blind spot area 275. As can be seen, in FIG. 4B emitted ultrasonic pulse 401 is reflected back from object 210 and a first portion of the returned signal (1st reception 402A) is received by ultrasonic transducer 150 which is still in ringdown. The first portion (1st reception 402A) will be difficult or impossible to distinguish from the ringdown vibrations of transducer 150. A second portion of this returned signal (1st reception 402B) encounters housing 101 of device 100 or some other portion of device 100 (e.g., reflective surface 102, a holder of ultrasonic transducer 150, etc.) and is reflected back toward object 210 as reflected signal 403. Shortly after this, the ringdown time period, TRD, ends and ultrasonic transducer 150 is capable of resolving received returned signals. Reflected signal 403 is reflected back from object 210 where a first portion of this returned signal (2nd reception 404A) is received by ultrasonic transducer 150 which is now out of ringdown. This second reception 404A is received by ultrasonic transducer 150 between the end of ringdown (TRD) and twice the time of ringdown (T2RD). A second portion of this returned signal (2nd reception 404B) encounters housing 101 of device 100 or some other portion of device 100 (e.g., reflective surface 102, a holder of ultrasonic transducer 150, etc.) and is reflected back toward object 210 as reflected signal 405. Reflected signal 405 is reflected back from object 210 where a first portion of this returned signal (3rd reception 406A) is received by ultrasonic transducer 150 which is still out of ringdown. Third reception 406A is depicted as being received before two times the ringdown time period (T2RD), but may occur before or after T2RD in various embodiments. A second portion of this returned signal (3rd reception 406B) encounters housing 101 of device 100 or some other portion of device 100 (e.g., reflective surface 102, a holder of ultrasonic transducer 150, etc.) and may be reflected back toward object 210. In some embodiments, this process of repeated reflections and reception may repeat one or more additional times.

Using techniques described herein, a variety of information may be discerned about the presence or absence of an object in the ringdown blind spot area, to include the location of an object within the ringdown blind spot area. For example, a candidate echo can be identified in a time between ringdown (TRD) and two times ringdown (T2RD). It may be identified by its peak and by the echo having a magnitude that exceeds a threshold. Other techniques may be used to identify it. It is called a "candidate echo" because it is yet to be determined if it is a primary echo of an object outside the ringdown blind spot area (e.g., like returned signals 202) or a higher order echo of an object inside the ringdown blind spot area (second echo off the object, third echo off the object, etc.). If the candidate echo ends up not being validated as a higher order echo from an object, then it is not reflected from or indicative of an object in the ringdown blind spot area of a transducer. However, if it is validated as being a higher order echo itself (e.g., a second reception 404A, a third reception 406A, etc.), then the candidate echo is indicative of an object located in the ringdown blind spot area of a transducer. For example, if one or more higher order echoes of the candidate echo are found in the 1X to 2X ringdown region, then it is known that there is an object within the ringdown blind spot area of the transducer. In some embodiments, validation is accomplished by comparing the candidate echo with other higher order echoes (i.e., later in time than the candidate echo). The comparison may consider the amplitude, shape, and/or position of the signal peaks due to the various echoes of different orders. The comparison may also be based on an autocorrelation operation. For example, if the observed peaks correspond to returned signal from an object in the ringdown blind spot area, it is expected that the peak have a decreasing amplitude with increasing order, the peak have similar shapes, and the peaks are spaced at similar intervals. In one embodiment, the distance between one set of adjacent peaks of suspected higher order echoes is compared to the distance between another set of adjacent peaks of suspected higher order echoes. If the distances are very similar, such as within a preset margin of acceptable error then the echoes are validated as higher order echoes of the candidate echo. Once validation is accomplished, and if the distance between adjacent peaks is less than DRDBS, then a distance or average distance from adjacent peaks of these echoes (the candidate echo and its identified higher order echoes) can be measured to estimate the distance of the object (which is in the ringdown blind spot area) from the transducer. In other instances, if no candidate echo is identified in the 1X to 2X ringdown time period, then it may be presumed that there are no objects in the ringdown blind spot area of the transducer, or the higher order returned signals are so low that they cannot be measured. The greater the number of higher order peaks used in the analysis, the higher the confidence in determining if, and where, an object is present in the ringdown blind spot area. In a situation where only one higher order echo is used in addition to the candidate echo, it is possible that the higher order echo is due to another object, rather than being a higher order echo. In this case, the amplitude of the echo and the shape of the echo can be used. In a situation where two higher order echoes are observed and used in addition to the candidate echo, it is possible that both the higher order echoes are due to other objects, but this is more unlikely. In general, the greater the number of higher order echoes that are observed and used, the better the analysis. Furthermore, the more characteristics of the peak that are used (position, amplitude, shape), the better the analysis.

Figure 5:
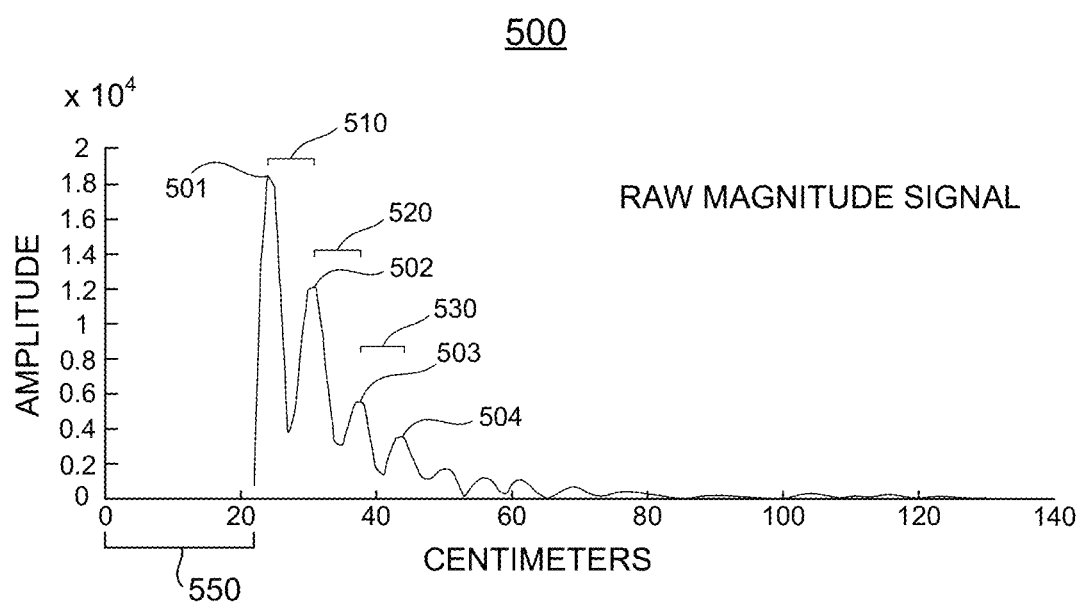
FIG. 5 illustrates a ringdown blind spot area in a graph of raw magnitude returned signals of echoes received from an object by a sonic transducer, in accordance with various embodiments.

FIG. 5 illustrates a ringdown blind spot area 550 in a graph 500 of raw magnitude returned signals of higher order echoes received from an object by a sonic transducer (e.g., ultrasonic transducer 150), in accordance with various embodiments. The x-axis represents centimeters, while the y-axis is raw amplitude/magnitude of received returned signals. It should be appreciated that the illustrated distances are roundtrip times-of-flight which have been converted to centimeters. By way of example, peak 501 is the peak of a higher order echo reflection which may correspond to the second reception 404A of received returned signals illustrated in FIG. 4B. This echo associated with peak 501 is considered a candidate echo until it is validated as being "higher order," (e.g., at least a second-order echo of pulse emission 401, where the received returned signals of the first-order echo of pulse emission 401 in the form of first reception 402A have not been captured due to their return to the transducer during ringdown). Put differently, any higher order echo represents a returned signal from the emitted pulse which has reflected from device 100 at least once before being received by ultrasonic transducer 150. This is contrasted with a direct reflection which is the first echo (i.e., "first-order" or "primary echo") off an object of the emitted pulse. Similarly, peak 502 is the peak of a higher order echo which may correspond to the third reception 406A of received returned signals illustrated in FIG. 4B. Likewise, peaks 503 and 504 may correspond to subsequent higher order echoes following peak 502. As discussed above, to determine if candidate echo/peak 501 corresponds to a higher order reflection of an object in the ringdown blind spot area, characteristics of peak 501 can be compared to the higher order peak 502, 503, etc. A distance 510 in centimeters (based on roundtrip time-of-flight) between peaks 501 and 502 is illustrated, as is a distance 520 between peaks 502 and 503, and a distance 530 between peaks 503 and 504. In one embodiment, the average of distances 510, 520, and 530 is 5.1 centimeters. With respect to the identified echoes, the candidate echo may be referred to as echo one or E1; it has a peak 501 and a location of LE1 with respect to the ultrasonic transducer. Similarly, the second echo may be referred to as echo two or E2; it has a peak 502 and a location of LE2 with respect to the ultrasonic transducer. The third echo may be referred to as echo three or E3; it has a peak 503 and a location of LE3 with respect to the ultrasonic transducer. Finally, the fourth echo may be referred to as echo four or E4; it has a peak 504 and a location of LE4 with respect to the ultrasonic transducer.

Figure 6A:
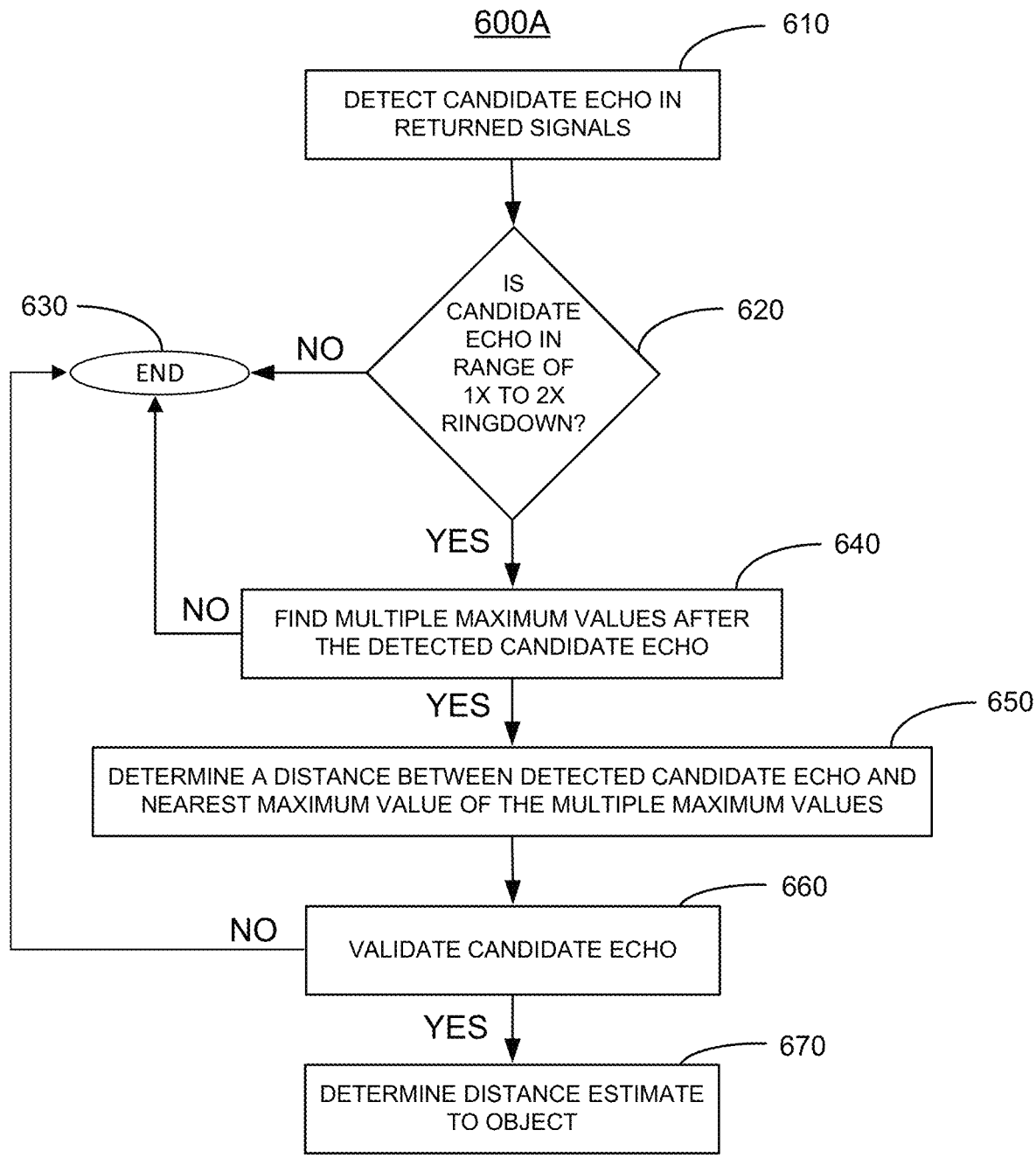
FIG. 6A illustrates an example flowchart for estimating a location of an object in close proximity (e.g., in the ringdown blind spot area) to an ultrasonic transducer, in accordance with various embodiments.

FIG. 6A illustrates a flowchart 600A for estimating a location of an object in close proximity (e.g., in the ringdown blind spot area) to an ultrasonic transducer, in accordance with various embodiments. With reference to FIGS. 4A, 4B, and 5, the higher-order echoes illustrated in FIG. 5 can be used to estimate the location of object 210, even though object 210 is in such close proximity to ultrasonic transducer 150 that it is within the ringdown blind spot area 275 of ultrasonic transducer 150.

At 610, in various embodiments, the returned signals received by ultrasonic transducer 150 are evaluated and a candidate echo is identified among them. In the example illustrated by FIG. 5, peak 501 is the peak of a candidate echo that fits this description as it is the first peak after the end of the ringdown time period $T_{RD}$. The peak may be required to satisfy certain criteria to qualify as a peak of a candidate echo. For example, in some embodiments, the peak may need to exceed a threshold value. The threshold value may be pre-determined in any suitable manner. For example, in some embodiments, the threshold value may be empirically determined for a sonic transducer or class of sonic transducers (e.g., for ultrasonic transducers 150 which share a common manufacturer's part number). The threshold value may be fixed in some embodiments. In some embodiments, the threshold may be variable or adaptive. For example, it may be higher when it is at or just after time $T_{RD}$ and lower when it is at or just before time $T_{2RD}$; and in-between it may adjust in steps or at a defined slope between the start and end threshold values. The adaptive threshold accounts for larger amplitude of higher order echoes from objects 210 in the ringdown blind spot area which are nearer to ultrasonic transducer 150 than those which are farther away from ultrasonic transducer 150 while still being within the ringdown blind spot area.

At 620, in various embodiments, it is determined if the candidate echo is between one times and two times the ringdown time period (e.g., between $T_{RD}$ and $T_{2RD}$). If not, the process of flowchart 600A ends at 630 and may be repeated with another candidate echo if one can be identified which meets the criteria discussed above. If so, the process of estimating the location of the object will continue at block 640. In this example, the candidate echo has a peak 501 which occurs between the end of the ringdown time period ($T_{RD}$) and twice the ringdown time period ($T_{2RD}$), and thus the process of evaluating this candidate echo and estimating the location of object 210 continues at block 640.

At block 640, in various embodiments, multiple additional peaks of additional higher-order echoes are found after the peak of the candidate echo in the remaining returned signals. In various embodiments, a higher order echo may be identified by one or more of its amplitude, shape, and spacing. For example, the amplitude of a peak of each successive higher order echo should be smaller than its predecessor echo, the shape should be similar, and overall spacing should be similar between adjacent pairs of higher order echoes. Thus, if the amplitude of a potential third order echo of a candidate echo is higher than that of an already identified second order echo of the candidate echo, the potential third order echo may be ruled out. Similarly, if spacing between a potential higher order echo and its immediately adjacent predecessor higher order echo deviates beyond some threshold (such as 10%, 15%, or 20%) it may be ruled out from consideration. With reference to FIG. 5, after peak 501 several additional peaks can be found, such as: peak 502, peak 503, peak 504, etc. These additional peaks are associated with higher order returned signals (i.e., repeated reflections) which are successively lower in amplitude, similar in shape to one another, and consistent in spacing from one another. In some embodiments, in the event that at least one additional maximum value cannot be found, the method ends. In some embodiments, in the event that at least two additional maximum values cannot be found, the method ends. In some embodiments, identification of multiple higher order echoes of the candidate echo occurs (especially if one or more of them occurs prior to two times the ringdown time (T2RD)), then there is knowledge that there is an object in the ringdown blind spot area even if its location has not yet been determined.

At block 650, in various embodiments, a distance is determined between the detected candidate echo and the nearest maximum value of the multiple maximum values. This distance is determined by any suitable means such as by translating the time between the peaks to a distance. For example, this may be a distance between peak 501 and peak 502. This distance can be used in 670 to estimate the distance between the ultrasonic transducer 150 and the object 210. In other embodiments, an average distance between peaks may be used, and thus other distances may be determined. For example, in a similar fashion, distances can be determined between other adjacent maximum peaks, such as: between peak 502 and peak 503; and between peak 503 and peak 504. In some embodiments, distances between non-adjacent peaks may be found, such as: the distance between peak 501 and peak 503; or the distance between peak 501 and peak 504. In some embodiments, "locations" of the candidate echo's peak 501 and one or more of the other identified peaks (e.g., 502, 503, 504, etc.) with respect to ultrasonic transducer 150 may be determined as if they are the locations of objects sending back primary echoes to ultrasonic transducer 150 (e.g., their "distances" from ultrasonic transducer 150 may be found); and these "locations" with respect to ultrasonic transducer 150 may be used to determine some or all of the distances between peaks.

At 660, the candidate echo is validated to determine whether it is at least a secondary echo that is associated with an object located in the ringdown blind spot area rather than a primary echo from an object outside of the ringdown blind spot area. In some embodiments, this validation involves determining a variation of distances between peaks identified at 610 and ensuring that the variance is below a threshold. The threshold may be predetermined in any suitable manner. In one embodiment, the threshold may be the epsilon (ε) value (allowed error) for this calculation. Epsilon may be related to the precision (or uncertainty in measurement) of transducer 150. For example, if the precision of the transducer is limited to measuring the position of an object to within 5 mm, the value of Epsilon may be chosen to be 2.0 times the precision (i.e., 10 mm), 1.2 times the precision (i.e., 6 mm), or some other value that is arrived at as a factor of the precision of the transducer. Precision may depend on one or more factors such as the frequency of the operating system (FOP) of the transducer, sound speed, propagation, and internal parameter(s) that can be set in firmware. Generally, Epsilon is very small, such as one or two times the precision of the ultrasonic transducer. In some embodiments, the value of Epsilon may need to be tuned or adjusted, such as empirically during use of a transducer. Equation 1 may be utilized in some embodiments to validate the candidate echo as being at least a secondary echo:

$$|LE3-2(LE2)+LE1|<\varepsilon \qquad \text{Equation 1}$$

Where:

LE1 is the location with respect to the transducer of the candidate echo's peak (e.g., peak 501);

LE2 is the location with respect to the transducer of the peak (e.g., peak 502) of E2, the first echo found after the candidate echo's peak (e.g., peak 501);

LE3 is the location with respect to the transducer of the peak (e.g., peak 503) of E3, the second echo found after the candidate echo's peak (e.g., peak 501);

ε is the threshold of allowed error by which similarity of distances between pairs of adjacent peaks is judged.

The concept of Equation 1 is that the difference between the distance from peak 501 to peak 502 and the distance from peak 502 to peak 503 should be smaller than ε for the candidate echo to be validated as at least a second order reflection of the object. In other words, the variance of the distance between peaks should be below the threshold value ε. Other mechanisms for validation may be utilized. If the candidate echo cannot be validated, the process may end or start over with another candidate echo. In some embodiments, if the candidate echo cannot be validated it may be presumed there is no object present in the ringdown blind spot area of the transducer. If the candidate echo is validated, the process moves on to 670 to determine a distance estimate from the ultrasonic transducer 150 to the object 210.

At 670 the distance from ultrasonic transducer 150 to object 210 is estimated. In some embodiments, the distance between any two adjacent identified peaks may be used for the distance estimate. For example, the distance between peak 501 and peak 502 or the distance between peak 502 and peak 503 may be used for the distance estimate. In some embodiments, a mean or average distance between a plurality of peaks may be used. For example the distance to peak 501 may be subtracted from the distance to peak 503 and the total divided by 2 (i.e., (LE3−LE1)/2); or the distance to peak 501 may be subtracted from the distance to peak 504 and divided by 3 (i.e., LE4−LE1)/3).

Figure 6B:
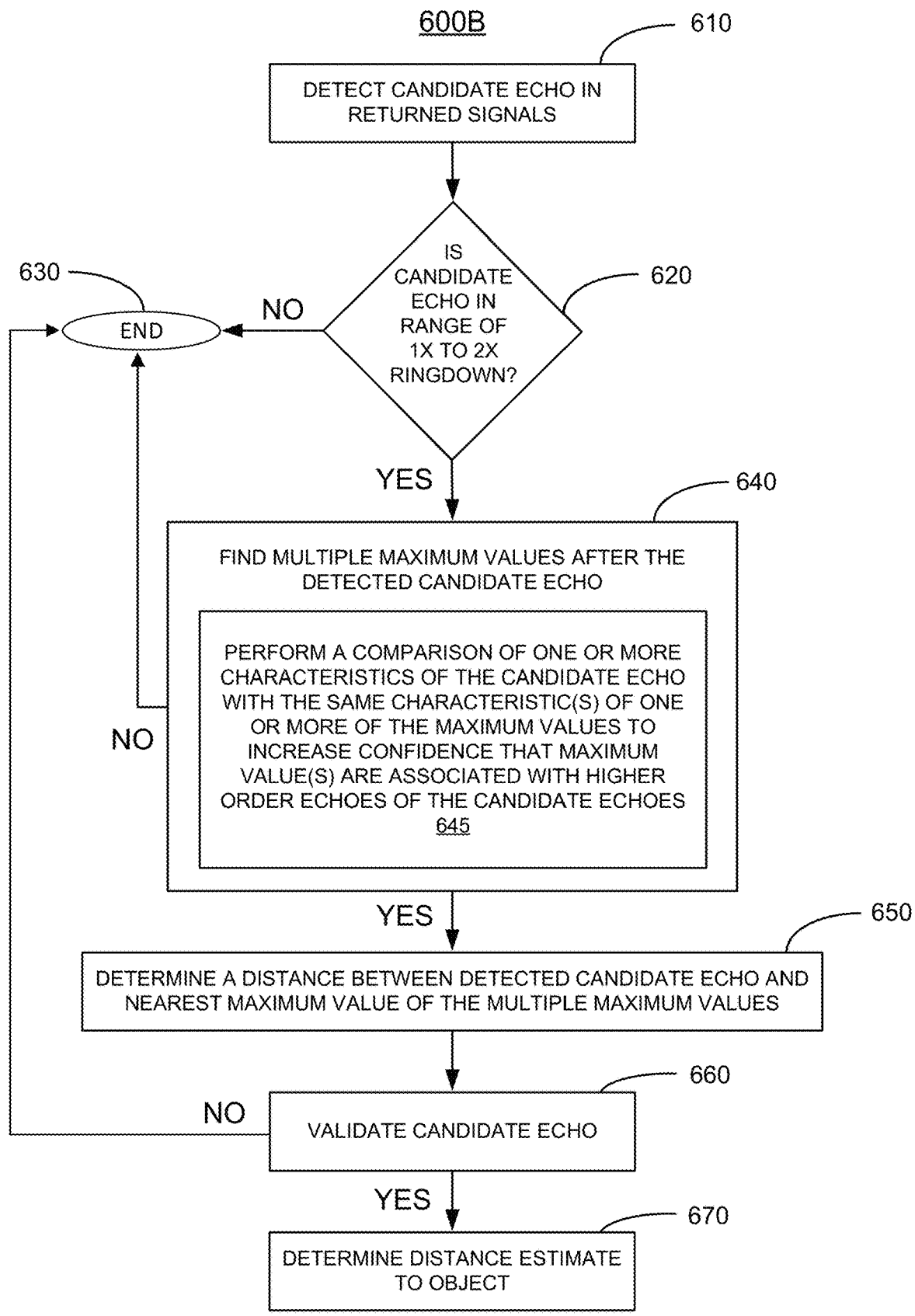
FIG. 6B illustrates another example flowchart for estimating a location of an object in close proximity (e.g., in the ringdown blind spot area) to an ultrasonic transducer, in accordance with various embodiments.

FIG. 6B illustrates another example flowchart for estimating a location of an object in close proximity (e.g., in the ringdown blind spot area) to an ultrasonic transducer, in accordance with various embodiments. FIG. 6A is similar to FIG. 6B except that block 645 has been added. For example, in some embodiments, as part of finding multiple values after the detected candidate echo comparison(s) to the candidate echo may be performed to ensure or raise the confidence that the echoes associated with the maximum value are higher order echoes of the candidate echo. The characteristics may include one or more of shape and amplitude. With respect to shape, the shape should be similar overall and any variation in width should be similar in the comparison. With respect to amplitude, the amplitude of any higher order echo should be less than that of the candidate echo and also less than the amplitude of any predecessor higher order echoes (i.e., less than any echoes between the compared echo and the candidate echo).

For example, at 645 of flowchart 600B, in some embodiments, a comparison is performed of one or more characteristics of the candidate echo with the same characteristic(s) of one or more of the maximum values to increase confidence that maximum value(s) are associated with higher order echoes of the candidate echoes.

Figure 7:
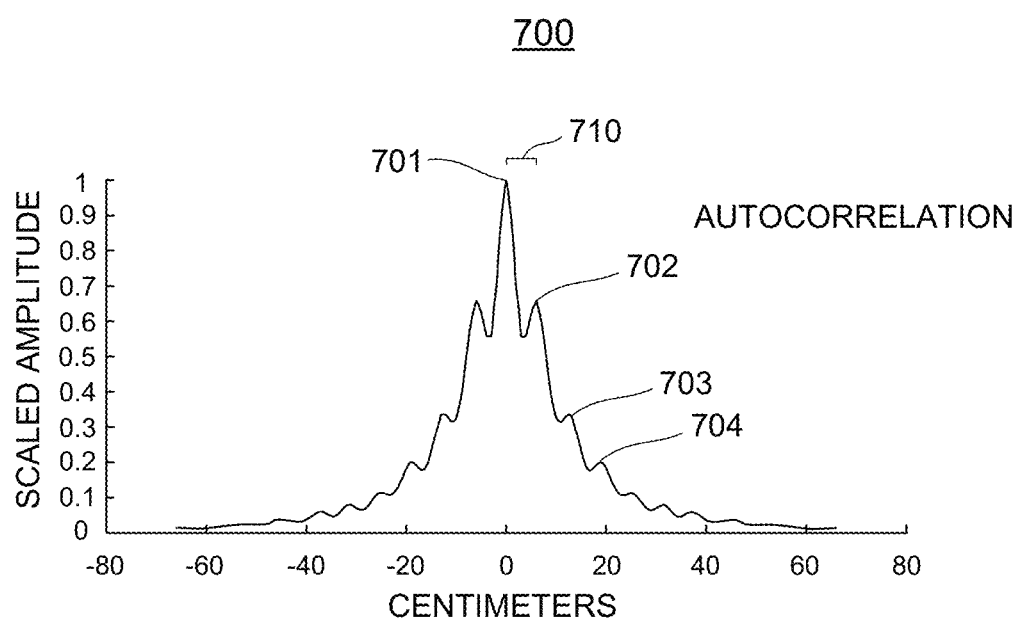
FIG. 7 illustrates a graph of autocorrelated raw signals and use of autocorrelation to estimate a location of an object in a ringdown blind spot area of a sonic transducer, in accordance with various embodiments.

Referring now to FIG. 7, in some embodiments, validation of the candidate echo can be performed using an autocorrelation method. FIG. 7 illustrates a graph 700 of autocorrelated raw signals and use of autocorrelation to estimate a location of an object in a ringdown blind spot area of a sonic transducer, in accordance with various embodiments. The x-axis shows distance represented in centimeters, based on round-trip time of flight, while the y-axis is amplitude scaled between zero and one (where the primary echo or signal in a correlated, repeating series is set to an amplitude of one and centered at zero). For example, the waveform of graph 700 may be considered an autocorrelation of the entirety of the raw magnitude returned signals shown in FIG. 5. Autocorrelation looks for repeating patterns within a signal over time. Put differently, autocorrelation obtains the amount or degree to which a time-series of data is similar to itself (i.e., has repeating patterns). By using autocorrelation, a periodic component embedded in the time-series of raw magnitude data, such as higher order echoes/reflections in a signal, can be discerned if it exists. Many techniques for autocorrelation are well-known in the art.

Autocorrelation results, as illustrated in graph 700, may be obtained using any suitable autocorrelation technique to automatically correlate repeating patterns within a signal. Peaks 702, 703, and 704 represent the autocorrelation of the peaks of higher order echoes of FIG. 5 (peaks 501, 502, etc.). As such, the autocorrelation shows how similarly spaced and shaped the peak of the higher order echoes are. Autocorrelation is more computationally intensive than the method discussed in FIG. 6A or FIG. 6B, but in an embodiment with a noisy raw magnitude signal it may be more robust in identifying higher order echoes of a candidate echo. In some embodiments, the correlated peaks of interest are 701 and 702 (the smallest repetition unit of peak 701), because this shows the smallest unit of repetition of the candidate echo's peak in FIG. 5. Therefore, the distance between peaks 701 and 702 can be used to represent an average distance between adjacent candidate echo and higher order peaks in FIG. 5. Consequently, this also represents the distance between the transducer and the first echo/reflection, and thus the distance between peaks 701 and 702 is a representation or estimate of the distance between the object and the transducer.

Figure 8:
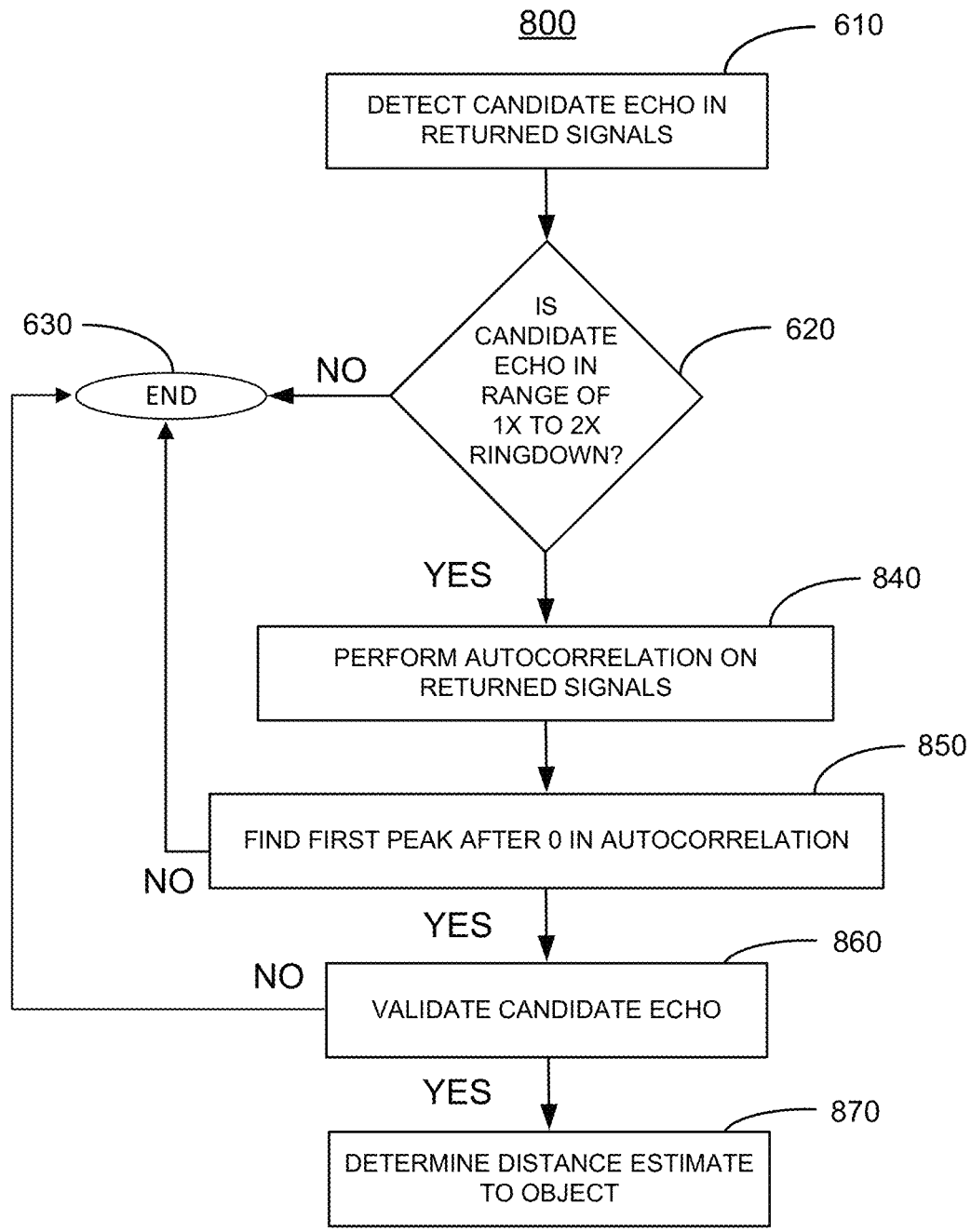
FIG. 8 illustrates an example flowchart for estimating a location of an object in close proximity (e.g., in the ringdown blind spot area) to an ultrasonic transducer, in accordance with various embodiments.

FIG. 8 illustrates a flowchart 800 for estimating a location of an object 210 in close proximity (e.g., in the ringdown blind spot area) to an ultrasonic transducer such as ultrasonic transducer 150, in accordance with various embodiments. With reference to FIGS. 4A, 4B, 5, 6A, 6B, and 7, autocorrelation of a raw signal can be used to discover repeating peaks of reflections that are used to estimate the location of object 210, even though object 210 is in such close proximity to ultrasonic transducer 150 that it is within the ringdown blind spot area 275 of ultrasonic transducer 150.

At 610 of flowchart 800, in various embodiments, the returned signals received by ultrasonic transducer 150 are evaluated and a candidate echo is identified among them. In the example illustrated by FIG. 5, peak 501 is the peak of a candidate echo that fits this description as it is the first peak after the end of the ringdown time period TRD. The peak may be required to satisfy certain criteria to qualify as a peak of a candidate echo. For example, in some embodiments, the peak may need to exceed a threshold value. The threshold value may be pre-determined in any suitable manner. For example, in some embodiments, the threshold value may be empirically determined for a sonic transducer or class of sonic transducers (e.g., for transducers which share manufacturers part number). In some embodiments, the threshold may be variable or adaptive. For example, it may be higher when it is at or just after time TRD and lower when it is at or just before time T2RD; and in-between it may adjust in steps or at a defined slope between the start and end threshold values. The adaptive threshold accounts for larger amplitude of higher order echoes from objects 210 in the ringdown blind spot area which are nearer to ultrasonic transducer 150 than those which are farther away from ultrasonic transducer 150 while still being within the ringdown blind spot area.

At 620 of flowchart 800, in various embodiments, it is determined in the candidate echo is between one times and two times the ringdown time period (e.g., between $T_{RD}$ and $T_{2RD}$). If not, the process of flowchart 800 ends at 630 and may be repeated with another candidate echo. If so, the process of estimating the location of the object will continue at block 640. In this example, the candidate echo has a peak 501 which occurs between the end of the ringdown time period ($T_{RD}$) and twice the ringdown time period ($T_{2RD}$), and thus the process of evaluating this candidate echo and estimating the location of object 210 continues at block 640. In some embodiments, when a candidate echo cannot be found between $T_{RD}$ and $T_{2RD}$, then it may be presumed there is no object to detect or locate in the ringdown blind spot area of transducer 150.

At 840 of flowchart 800, autocorrelation of the raw magnitude received returned signals illustrated in FIG. 5 is performed. The autocorrelation identifies the repetitive characteristics of the different echoes and is thus used to determine whether other observed peaks are higher order echoes corresponding to the candidate echo. The autocorrelation can identify multiple maximum values after the detected candidate echo.

In some embodiments, an additional procedure similar to that discussed in 640 of flowchart 600A or flowchart 600B may be added in between 620 and 840 of flowchart 800 to identify multiple maximum values after the candidate echo, and only proceed to autocorrelation in 840 in response to finding of the multiple maximum values. This may be accomplished to raise confidence in the candidate echo as being a higher order echo prior to expending computational resources on performing autocorrelation in block 840.

At 850 of flowchart 800, the first peak after zero in the autocorrelation is identified. In the example, this is peak 702. The peak may be identified by one or more of the shape, width, and/or amplitude of the reflection for which it is a peak. For example, in some embodiments, the shape and/or width of the reflection which has a peak 702 may be required to be similar to but scaled down from the shape and/or width of the reflection which has a peak 701. In some embodiments, the amplitude of peak 702 is required to meet certain criteria in comparison to the amplitude of peak 701, such as being smaller and/or being within a certain range such as 50% to 95% of the amplitude of peak 701.

At 860 of flowchart 800, the candidate echo is validated to determine whether it is at least a secondary echo that is associated with an object located in the ringdown blind spot area rather than a primary echo from an object outside of the ringdown blind spot area.

In some embodiments, based on the results of the autocorrelation, the candidate echo is validated. If the candidate echo and the higher order echoes are all higher order reflections of the same object, the autocorrelation will show a peak at the object's distance, as shown in FIG. 7 by peak 702. In some embodiments, additional qualifiers may be required such as the amplitude of the first peak after zero having an amplitude above a certain threshold. This threshold may be fixed or based on a percentage of the amplitude of the peak at zero (peak 701) of the autocorrelation. The width of the peak may also be used as a qualifier for successful autocorrelation, where a narrower (and higher) peak indicates a better autocorrelation.

Other mechanisms for validation may be utilized. In some embodiments, if the candidate echo cannot be validated, the process may end or start over with another candidate echo and/or using another technique (such as the technique of flowchart 600A). In some embodiments, if the candidate echo cannot be validated it may be presumed there is no object present in the ringdown blind spot area of the transducer and the process ends at 630. If the candidate echo is validated, the process moves on to 670 to determine a distance estimate from the ultrasonic transducer 150 to the object 210.

At 870 of flowchart 800, the distance from ultrasonic transducer 150 to object 210 is estimated. In some embodiments, the distance between any two adjacent autocorrelated peaks in the autocorrelated returned signals may be used for the distance estimate. For example, the distance between peak 701 and peak 702 may be used as the estimate. Similarly, in some embodiments, the distance between peak 702 and peak 703 may be used as the estimate. In some embodiments, a mean or average distance may be used.

Example Methods of Operation

Procedures of the methods illustrated by flow diagram 900 of FIG. 9, flow diagram 1000 of FIGS. 10A and 10B, and flow diagram 1100 of FIGS. 11A and 11B will be described with reference to elements and/or components of one or more of FIGS. 1-8. It is appreciated that in some embodiments, the procedures may be performed in a different order than described in a flow diagram, that some of the described procedures may not be performed, and/or that one or more additional procedures to those described may be performed. Flow diagrams 900, 1000, and 1100 include some procedures that, in various embodiments, are carried out by one or more processors (e.g., processor 130, host processor 110, controller 151, a DSP, ASIC, ASIP, FPGA, or the like) under the control of computer-readable and computer-executable instructions that are stored on non-transitory computer-readable storage media (e.g., host memory 111, internal memory 140, or the like). It is further appreciated that one or more procedures described in flow diagram 900, flow diagram 1000, and/or flow diagram 1100 may be implemented in hardware, or a combination of hardware with firmware and/or software.

FIG. 9 illustrates a flow diagram of a method of estimating a location of an object in close proximity to an ultrasonic transducer. By "in close proximity," what is meant is that the object is within a ringdown blind spat area of the ultrasonic transducer.

With reference to FIG. 9, at procedure 910 of flow diagram 900, in various embodiments, returned signals from a pulse emitted by an ultrasonic transducer are evaluated to find a candidate echo from an object in the returned signals. The returned signals being evaluated are received after a ringdown period of the ultrasonic transducer, and the candidate echo occurs in a time window between one and two times the ringdown period of the ultrasonic transducer. The ultrasonic transducer may be an ultrasonic transducer such as ultrasonic transducer 150 of FIGS. 1A and 1B. In various embodiments, the evaluating is performed by a processor which is communicatively coupled with the ultrasonic transducer (e.g., host processor 110, sensor processor 130, and/or controller 151). With reference to FIG. 5, the peaking waveform associated with peak 501 is an example of a candidate echo which has been found by such evaluation.

In some embodiments, as part of the evaluating, the candidate echo may be selected to have a peak value which exceeds a preestablished threshold of magnitude. In some embodiments, the threshold may be fixed. In other embodiments, the threshold may be varied or adjusted based on a time of occurrence of the candidate echo within the time window, wherein the preestablished threshold of magnitude is adjusted downward as time increases. For example, the amount of variance of the magnitude may be determined empirically, by calibration of the ultrasonic transducer, or may just be a straight-line/linear slope of decay. In some embodiments, the preestablished threshold may be adjusted based on changes in atmospheric conditions such as temperature, humidity, and/or barometric pressure, as some atmospheric conditions may impact the propagation of ultrasonic signals and/or the operation of the ultrasonic transducer.

With continued reference to FIG. 9, at procedure 920 of flow diagram 900, in various embodiments, multiple echoes from the object, which are of higher order than the candidate echo, are located in the return signal. In various embodiments, the locating is performed by a processor which is communicatively coupled with the ultrasonic transducer (e.g., host processor 110, sensor processor 130, and/or controller 151). The location may involve comparing at least one of a shape and a magnitude of the candidate echo to at least one of the multiple echoes which are being considered during the locating. For example, in some embodiments, the overall shape and/or width of a higher order echo may be required to be similar to that of the candidate echo, to be considered a higher order echo of the candidate echo. In some embodiments, the magnitude of a higher order echo may be required to be less than that of the candidate echo. In some embodiments, the magnitude of a higher order echo may be required to be less than that of its immediately preceding higher order echo. With reference to FIG. 5, the echoes associated with each of peaks 502, 503, and 504 are examples of multiple successive higher order echoes of the candidate echo associated with peak 501.

In some embodiments, the locating may be performed by analyzing the results of an autocorrelation performed on raw returned signals. The autocorrelation can be used to determine if the observed echo corresponds to different higher order reflections of the same object. The peaks in the autocorrelation graph can then be used to determine the distance from the transducer to an object in the ringdown blind spot area of the transducer.

With continued reference to FIG. 9, at procedure 930 of flow diagram 900, in various embodiments, based on analysis of at least two of the multiple echoes of the higher order echo, the candidate echo is validated as being at least a secondary echo associated with the object located in a ringdown blind spot area of the ultrasonic transducer. The ringdown blind spot area is located between the ultrasonic transducer and a closest distance at which objects can be sensed by the ultrasonic transducer (that is, the distance associated with the first receipt of signals not drowned out by ringdown vibrations of the transducer). In various embodiments, the validating is performed by a processor which is communicatively coupled with the ultrasonic transducer (e.g., host processor 110, sensor processor 130, and/or controller 151). As described in conjunction with 660 of FIGS. 6A, 6B and 8, the validation may involve determining variations in the distance between at least two sets of adjacent peaks of echoes of the multiple higher order echoes. In response to the variance being below a threshold, the validation is performed (i.e., the candidate echo is validated as being at least a secondary echo from an object rather than a primary echo from an object). In some embodiments, the threshold to which the variance is compared is referred to as Epsilon as discussed above in conjunction with Equation 1. In some embodiments the threshold is associated with a resolution parameter of the ultrasonic transducer, such as the degree of precision to which the transducer can resolve a location. For example, in some embodiments, the threshold may be set at some multiple between 1 and 3 times the precision of the transducer.

With continued reference to FIG. 9, at procedure 940 of flow diagram 900, in various embodiments, based on analysis of the returned signals, a distance is estimated from the ultrasonic transducer to the object in the ringdown blind spot area. This distance may be referred to as the "estimated distance." In various embodiments, the estimating (i.e., the determining of an estimate) is performed by a processor which is communicatively coupled with the ultrasonic transducer (e.g., host processor 110, sensor processor 130, and/or controller 151).

In some embodiments, the estimate may be determined by calculating a mean (i.e., average) distance between occurrence of echoes of the multiple echoes.

In some embodiments, the estimate may be determined by performing an autocorrelation on the raw returned signals to find echoes which correlate with one another. If the autocorrelation has previously been performed, then results of the previously performed autocorrelation may be utilized. The autocorrelation finds a local maximum which correlates with the peak of the candidate echo. FIG. 7 illustrates a local maximum at peak 702, which correlates to peak 701 (of the candidate echo, which is located at zero in the autocorrelation). In various embodiments, the estimated distance to the object is determined by measuring a distance from a zero point of the autocorrelation to the first local maximum (e.g., by measuring a distance 710 from peak 701 to peak 702).

With continued reference to FIG. 9, at procedure 950 of flow diagram 900, in various embodiments, a signal indicating the estimated distance from the ultrasonic transducer to the object is provided. In various embodiments, the signal is provided by a processor which is communicatively coupled with the ultrasonic transducer (e.g., host processor 110, sensor processor 130, and/or controller 151). The signal provides information which allows a processor or logic of a device 100 to take a particular action, such as pausing movement or avoiding the object.

Figure 10B:
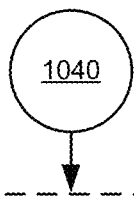

FIGS. 10A and 10B illustrate a flow diagram of a method of determining presence of an object in a ringdown blind spot area of an ultrasonic transducer, in accordance with various embodiments.

With reference to FIG. 10A, at procedure 1010 of flow diagram 1000, in various embodiments, returned signals from a pulse emitted by the ultrasonic transducer are evaluated to find a candidate echo in the returned signals which occurs in a time window between one and two times the ringdown period of the ultrasonic transducer and which exceeds a preestablished threshold of magnitude. The returned signals are received after a ringdown period of the ultrasonic transducer. The ultrasonic transducer may be an ultrasonic transducer such as ultrasonic transducer 150 of FIGS. 1A and 1B. In various embodiments, the evaluating is performed by a processor which is communicatively coupled with the ultrasonic transducer (e.g., host processor 110, sensor processor 130, and/or controller 151). With reference to FIG. 5, the peaking waveform associated with peak 501 is an example of a candidate echo which has been found by such evaluation.

In some embodiments, as part of the evaluating, the candidate echo may be selected to have a peak value which exceeds a preestablished threshold of magnitude. In some embodiments, the threshold may be fixed. In other embodiments, the threshold may be varied or adjusted based on a time of occurrence of the candidate echo within the time window, wherein the preestablished threshold of magnitude is adjusted downward as time increases. For example, the amount of variance in magnitude may be determined empirically, by calibration of the ultrasonic transducer, or may just be a straight-line/linear slope of decay. In some embodiments, the preestablished threshold may be adjusted based on changes in atmospheric conditions such as temperature, humidity, and/or barometric pressure, as some atmospheric conditions may impact the propagation of ultrasonic signals and/or the operation of the ultrasonic transducer.

With continued reference to FIG. 10A, at procedure 1020 of flow diagram 1000, in various embodiments, multiple echoes of sequentially diminishing magnitude at substantially regularly spaced offsets from the candidate echo are located within the returned signals. In various embodiments, the locating is performed by a processor which is communicatively coupled with the ultrasonic transducer (e.g., host processor 110, sensor processor 130, and/or controller 151). The locating may be performed in the manner previously described in 920 of FIG. 9. In various embodiments, the locating may be performed on the returned signals and/or autocorrelation of the returned signals may be utilized to perform the locating.

With continued reference to FIG. 10A, at procedure 1030 of flow diagram 1000, in various embodiments, based on analysis of at least two of the multiple echoes, the candidate echo is validated as being at least a secondary echo associated with an object located in the ringdown blind spot area of the ultrasonic transducer. The ringdown blind spot area is located between the ultrasonic transducer and a closest distance at which objects can be sensed by the ultrasonic transducer. In various embodiments, the validation is performed by a processor which is communicatively coupled with the ultrasonic transducer (e.g., host processor 110, sensor processor 130, and/or controller 151). The validation may be performed in the manner discussed previously in 930 of FIG. 9 and/or as discussed in conjunction with 660 of flowchart 600A/600B or 860 of flowchart 800.

With continued reference to FIG. 10A, at procedure 1040 of flow diagram 1000, in various embodiments, a signal is provided to indicate presence of the object as being detected within the ringdown blind spot area associated with the ultrasonic transducer. In various embodiments, the signal is provided by a processor which is communicatively coupled with the ultrasonic transducer (e.g., host processor 110, sensor processor 130, and/or controller 151). For example, in response to such a signal and knowledge of presence of an object in the ringdown blind spot area, a device 100, such as a drone or robot, may take an action such as halting, turning, or reversing course.

With reference to FIG. 10B, at procedure 1050 of flow diagram 1000, in various embodiments, based on analysis of the candidate echo and the multiple echoes, an estimated distance from the ultrasonic transducer to the object in the ringdown blind spot area is determined. In various embodiments, the determination is performed by a processor which is communicatively coupled with the ultrasonic transducer (e.g., host processor 110, sensor processor 130, and/or controller 151). The distance may be estimated in the manner discussed previously in 940 of FIG. 9 or and/or as discussed in conjunction with 670 of flowchart 600A/600B or 870 of flowchart 800.

With continued reference to FIG. 10B, at procedure 1060 of flow diagram 1000, in various embodiments, a signal is provided to indicate the estimated distance from the ultrasonic transducer to the object. In various embodiments, the signal is provided by a processor which is communicatively coupled with the ultrasonic transducer (e.g., host processor 110, sensor processor 130, and/or controller 151). The signal may facilitate a device 100, such as a drone or a robot, taking an action such as avoidance of the object.

Figure 11B:
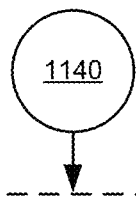

FIGS. 11A and 11B illustrate a flow diagram of a method of determining presence of an object in a ringdown blind spot area of an ultrasonic transducer, in accordance with various embodiments.

With reference to FIG. 11A, at procedure 1110 of flow diagram 1100, in various embodiments, returned signals from a pulse emitted by the ultrasonic transducer are evaluated to find a candidate echo in the returned signals which occurs in a time window between one and two times the ringdown period of the ultrasonic transducer and which exceeds a preestablished threshold of magnitude. The returned signals are received after a ringdown period of the ultrasonic transducer. The ultrasonic transducer may be an ultrasonic transducer such as ultrasonic transducer 150 of FIGS. 1A and 1B. In various embodiments, the evaluating is performed by a processor which is communicatively coupled with the ultrasonic transducer (e.g., host processor 110, sensor processor 130, and/or controller 151). With reference to FIG. 5, the peaking waveform associated with peak 501 is an example of a candidate echo which has been found by such evaluation.

In some embodiments, as part of the evaluating, the candidate echo may be selected to have a peak value which exceeds a preestablished threshold of magnitude. In some embodiments, the threshold may be fixed. In other embodiments, the threshold may be varied or adjusted based on a time of occurrence of the candidate echo within the time window, wherein the preestablished threshold of magnitude is adjusted downward as time increases. For example, the amount of variance may be determined empirically, by calibration of the ultrasonic transducer, or may just be a straight-line/linear slope of decay. In some embodiments, the preestablished threshold may be adjusted based on changes in atmospheric conditions such as temperature, humidity, and/or barometric pressure, as some atmospheric conditions may impact the propagation of ultrasonic signals and/or the operation of the ultrasonic transducer.

With continued reference to FIG. 11A, at procedure 1120 of flow diagram 1100, in various embodiments, an additional echo is located having a similar shape to the candidate echo, wherein the additional echo occurs later in the time window than the candidate echo. In various embodiments, the locating is performed by a processor which is communicatively coupled with the ultrasonic transducer (e.g., host processor 110, sensor processor 130, and/or controller 151). The locating may be performed in the manner previously described in 920 of FIG. 9, except that only one additional echo of higher order than the candidate echo need be located. In various embodiments, the locating may be performed on the returned signals and/or autocorrelation may be utilized to perform the locating.

With continued reference to FIG. 11A, at procedure 1130 of flow diagram 1100, in various embodiments, validating, by the processor based on analysis of the candidate echo and the additional echo, that the candidate echo is likely at least a secondary echo associated with an object located in the ringdown blind spot area of the ultrasonic transducer wherein the ringdown blind spot area is located between the ultrasonic transducer and a closest distance at which objects can be sensed by the ultrasonic transducer. In various embodiments, the validation is performed by a processor which is communicatively coupled with the ultrasonic transducer (e.g., host processor 110, sensor processor 130, and/or controller 151). The validation may involve comparing the magnitude and shape to ensure the magnitude of the additional echo is less and that the shapes of the candidate echo and additional echo are similar. If so, and as long as the additional echo is within the time window, in some embodiments, the candidate echo may be validated as being at least a secondary echo from an object (rather than being a primary echo). It should be noted that without verifying at least two additional higher order echoes of the candidate echo, there is lower confidence that the candidate echo itself is at least a secondary echo.

With continued reference to FIG. 11A, at procedure 1140 of flow diagram 1100, in various embodiments, in response to a successful validation of the candidate echo, a signal is provided to indicate presence of the object as being detected within the ringdown blind spot area associated with the ultrasonic transducer. In various embodiments, the signal is provided by a processor which is communicatively coupled with the ultrasonic transducer (e.g., host processor 110, sensor processor 130, and/or controller 151). For example, in response to such a signal and knowledge of presence of an object in the ringdown blind spot area, a device 100, such as a drone or robot, may take an action such as halting, turning, or reversing course.

With reference to FIG. 11B, at procedure 1150 of flow diagram 1100, in various embodiments, based on analysis of the candidate echo and the multiple echoes, an estimated distance from the ultrasonic transducer to the object in the ringdown blind spot area is determined. In various embodiments, the determination is performed by a processor which is communicatively coupled with the ultrasonic transducer (e.g., host processor 110, sensor processor 130, and/or controller 151). The distance may be estimated in the manner discussed previously in 940 of FIG. 9 or and/or as discussed in conjunction with 670 of flowchart 600A/600B or 870 of flowchart 800.

With continued reference to FIG. 11B, at procedure 1160 of flow diagram 1100, in various embodiments, a signal is provided to indicate the estimated distance from the ultrasonic transducer to the object. In various embodiments, the signal is provided by a processor which is communicatively coupled with the ultrasonic transducer (e.g., host processor 110, sensor processor 130, and/or controller 151). The signal may facilitate a device 100, such as a drone or a robot, taking an action such as avoidance of the object.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A device comprising:
   an ultrasonic transducer configured to emit an ultrasonic pulse and receive returned signals corresponding to the emitted ultrasonic pulse, wherein the returned signals are received after a ringdown period of the ultrasonic transducer; and
   a processor coupled with the ultrasonic transducer and configured to:
      evaluate the returned signals to find a candidate echo from an object in the returned signals, wherein the candidate echo occurs in a time window between one and two times the ringdown period of the ultrasonic transducer;
      locate multiple echoes from the object which are of higher order than the candidate echo;
      validate, based on analysis of at least two of the multiple echoes, the candidate echo as at least a secondary echo associated with the object located in a ringdown blind spot area of the ultrasonic transducer, wherein the ringdown blind spot area is located between the ultrasonic transducer and a closest distance at which objects can be sensed by the ultrasonic transducer; and determine, based on analysis of the returned signals, an estimated distance from the ultrasonic transducer to the object in the ringdown blind spot area.

2. The device of claim 1, further comprising a reflective surface coupled with the device, wherein the candidate echo has reflected off the reflective surface at least once.

3. The device of claim 2, wherein the reflective surface is configured to facilitate generation of higher order echoes from an object in the ringdown blind spot area.

4. The device of claim 1, wherein the processor configured to locate multiple echoes from the object which are of higher order than the candidate echo comprises the processor being configured to:
compare at least one of a shape and a magnitude of the candidate echo to at least one of the multiple echoes.

5. The device of claim 1, wherein the processor configured to validate, based on analysis of at least two of the multiple echoes, the candidate echo as at least a secondary echo associated with the object located in a ringdown blind spot area of the ultrasonic transducer comprises the processor being configured to:
determine a variance of distances between peaks of a plurality of the multiple echoes; and
responsive to the variance of distances being below a threshold, perform the validation of the candidate echo.

6. The device of claim 1, wherein the processor configured to determine an estimated distance from the ultrasonic transducer to the object in the ringdown blind spot area comprises the processor being configured to:
perform an autocorrelation on the returned signals;
find a local maximum; and
determine the estimated distance by measuring a distance from a zero point of the autocorrelation to the local maximum.

7. The device of claim 1, wherein the processor configured to determine an estimated distance from the ultrasonic transducer to the object in the ringdown blind spot area comprises the processor being configured to:
determine the estimated distance as being a mean distance between occurrence of echoes of the multiple echoes.

8. A sensor processing unit comprising:
an ultrasonic transducer configured to emit an ultrasonic pulse and receive returned signals corresponding to the emitted ultrasonic pulse; and
a sensor processor coupled with the ultrasonic transducer and configured to:
evaluate the returned signals, wherein the returned signals are received after a ringdown period of the ultrasonic transducer to find a candidate echo from an object in the returned signals, wherein the candidate echo occurs in a time window between one and two times the ringdown period of the ultrasonic transducer;
locate multiple echoes from the object which are of higher order than the candidate echo;
validate, based on analysis of at least two of the multiple echoes, the candidate echo as at least a secondary echo associated with the object located in a ringdown blind spot area of the ultrasonic transducer, wherein the ringdown blind spot area is located between the ultrasonic transducer and a closest distance at which objects can be sensed by the ultrasonic transducer; and
determine, based on analysis of the returned signals, an estimated distance from the ultrasonic transducer to the object in the ringdown blind spot area.

9. The sensor processing unit of claim 8, wherein the sensor processor configured to evaluate returned signals from a pulse emitted by the ultrasonic transducer, wherein the returned signals are received after a ringdown period of the ultrasonic transducer to find a candidate echo from an object in the returned signals comprises the sensor processor being configured to:
select the candidate echo to exceed a preestablished threshold of magnitude.

10. The sensor processing unit of claim 8, wherein the sensor processor configured to locate multiple echoes from the object which are of higher order than the candidate echo comprises the sensor processor being configured to:
compare at least one of a shape and a magnitude of the candidate echo to at least one of the multiple echoes.

11. The sensor processing unit of claim 8, wherein the sensor processor configured to validate, based on analysis of at least two of the multiple echoes, the candidate echo as at least a secondary echo associated with the object located in a ringdown blind spot area of the ultrasonic transducer comprises the sensor processor being configured to:
determine a variance of distances between peaks of a plurality of the multiple echoes; and
responsive to the variance of distances being below a threshold, perform the validation of the candidate echo.

12. The sensor processing unit of claim 8, wherein the sensor processor configured to determine an estimated distance from the ultrasonic transducer to the object in the ringdown blind spot area comprises the sensor processor being configured to:
perform an autocorrelation on the returned signals;
find a local maximum; and
determine the estimated distance by measuring a distance from a zero point of the autocorrelation to the local maximum.

13. The sensor processing unit of claim 8, wherein the sensor processor configured to determine an estimated distance from the ultrasonic transducer to the object in the ringdown blind spot area comprises the sensor processor being configured to:
determine the estimated distance as being a mean distance between occurrence of echoes of the multiple echoes.

14. A method of estimating a location of an object in close proximity to an ultrasonic transducer, the method comprising:
evaluating, by a processor coupled with an ultrasonic transducer, returned signals from a pulse emitted by the ultrasonic transducer, wherein the returned signals are received after a ringdown period of the ultrasonic transducer to find a candidate echo from an object in the returned signals, wherein the candidate echo occurs in a time window between one and two times the ringdown period of the ultrasonic transducer;
locating, by the processor within the returned signals, multiple echoes from the object which are of higher order than the candidate echo;
validating, by the processor based on analysis of at least two of the multiple echoes, the candidate echo as at least a secondary echo associated with the object located in a ringdown blind spot area of the ultrasonic transducer, wherein the ringdown blind spot area is located between the ultrasonic transducer and a closest distance at which objects can be sensed by the ultrasonic transducer;
estimating, by the processor based on analysis of the returned signals, a distance from the ultrasonic transducer to the object in the ringdown blind spot area; and providing, by the processor, a signal indicting the estimated distance from the ultrasonic transducer to the object.

15. The method as recited in claim 14, wherein the evaluating, by a processor coupled with an ultrasonic transducer, returned signals from a pulse emitted by the ultrasonic transducer, wherein the returned signals are received after a ringdown period of the ultrasonic transducer to find a candidate echo from an object in the returned signals comprises:
   selecting the candidate echo to have a peak value which exceeds a preestablished threshold of magnitude.

16. The method as recited in claim 15, further comprising:
   adjusting the preestablished threshold of magnitude based on a time of occurrence of the candidate echo within the time window, wherein the preestablished threshold of magnitude is adjusted downward as time increases.

17. The method as recited in claim 14, wherein the locating, by the processor, multiple echoes from the object which are of higher order than the candidate echo comprises:
   comparing at least one of a shape and a magnitude of the candidate echo to at least one of the multiple echoes.

18. The method as recited in claim 14, wherein the validating, by the processor based on analysis of at least two of the multiple echoes, the candidate echo as at least a secondary echo associated with the object located in a ringdown blind spot area of the ultrasonic transducer comprises:
   determining a variance of distances between peaks of a plurality of the multiple echoes; and
   responsive to the variance of distances being below a threshold, performing the validation of the candidate echo.

19. The method as recited in claim 18, wherein responsive to the variance of distances being below a threshold, performing the validation of the candidate echo comprises:
   responsive to the variance of distances being below a threshold associated with a resolution parameter of the ultrasonic transducer, performing the validation of the candidate echo.

20. The method as recited in claim 14, wherein the estimating, by the processor based on analysis of the returned signals, a distance from the ultrasonic transducer to the object in the ringdown blind spot area comprises:
   performing, by the processor, an autocorrelation on the returned signals;
   finding a local maximum; and
   determining the estimated distance by measuring a distance from a zero point of the autocorrelation to the local maximum.

21. The method as recited in claim 14, wherein the estimating, by the processor based on analysis of the returned signals, a distance from the ultrasonic transducer to the object in the ringdown blind spot area comprises:
   determining, by the processor, the estimated distance as being a mean distance between occurrence of echoes of the multiple echoes.

22. A method of determining presence of an object within a ringdown blind spot area of an ultrasonic transducer, the method comprising:
   evaluating, by a processor coupled with an ultrasonic transducer, returned signals from a pulse emitted by the ultrasonic transducer, wherein the returned signals are received after a ringdown period of the ultrasonic transducer, to find a candidate echo in the returned signals which occurs in a time window between one and two times the ringdown period of the ultrasonic transducer and which exceeds a preestablished threshold of magnitude;
   locating, by the processor within the returned signals, multiple echoes of sequentially diminishing magnitude at substantially regularly spaced offsets from the candidate echo;
   validating, by the processor based on analysis of at least two of the multiple echoes, that the candidate echo is at least a secondary echo associated with an object located in the ringdown blind spot area of the ultrasonic transducer wherein the ringdown blind spot area is located between the ultrasonic transducer and a closest distance at which objects can be sensed by the ultrasonic transducer; and
   providing, by the processor, a signal indicting presence of the object being detected within the ringdown blind spot area associated with the ultrasonic transducer.

* * * * *